United States Patent
Tamareselvy et al.

(10) Patent No.: US 9,187,590 B2
(45) Date of Patent: Nov. 17, 2015

(54) HYDROLYTICALLY STABLE MULTI-PURPOSE POLYMERS

(75) Inventors: Krishnan Tamareselvy, Brecksville, OH (US); Yanshi Zhang, Solon, OH (US); Deborah S. Filla, Twinsburg, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 348 days.

(21) Appl. No.: 13/513,306

(22) PCT Filed: Dec. 1, 2010

(86) PCT No.: PCT/US2010/058507
§ 371 (c)(1),
(2), (4) Date: Jun. 1, 2012

(87) PCT Pub. No.: WO2011/068837
PCT Pub. Date: Jun. 9, 2011

(65) Prior Publication Data
US 2012/0316308 A1     Dec. 13, 2012

Related U.S. Application Data

(60) Provisional application No. 61/265,402, filed on Dec. 1, 2009.

(51) Int. Cl.

| | | |
|---|---|---|
| C08F 12/28 | (2006.01) |
| C08F 220/44 | (2006.01) |
| C08F 2/00 | (2006.01) |
| C08G 61/02 | (2006.01) |
| C08G 61/04 | (2006.01) |
| C08F 297/02 | (2006.01) |
| C08F 8/00 | (2006.01) |
| C08G 63/48 | (2006.01) |
| C08F 220/34 | (2006.01) |
| C08F 220/18 | (2006.01) |
| C08F 216/14 | (2006.01) |
| C08F 220/26 | (2006.01) |
| C08F 222/10 | (2006.01) |
| C08F 230/08 | (2006.01) |

(52) U.S. Cl.
CPC ............ *C08F 220/34* (2013.01); *C08F 220/18* (2013.01); *C08F 216/1416* (2013.01); *C08F 220/26* (2013.01); *C08F 222/1006* (2013.01); *C08F 230/08* (2013.01)

(58) Field of Classification Search
CPC ............ C08F 220/18; C08F 216/1416; C08F 222/1006
USPC ............ 526/312, 310, 72, 341; 523/1; 520/1; 525/242, 55, 50, 313; 528/480, 491, 528/482
See application file for complete search history.

(56) References Cited

U.S. PATENT DOCUMENTS

| | | | |
|---|---|---|---|
| 4,885,102 A | 12/1989 | Yamamura et al. | |
| 5,133,970 A | 7/1992 | Petereit et al. | |
| 5,594,067 A | 1/1997 | Doi et al. | |
| 7,378,479 B2 * | 5/2008 | Tamareselvy et al. | ........ 526/333 |
| 2004/0241130 A1 | 12/2004 | Tamareselvy et al. | ..... 424/70.16 |
| 2007/0203311 A1 * | 8/2007 | Roy et al. | ................... 526/238.2 |
| 2012/0237465 A1 | 9/2012 | Tamareselvy et al. | |

FOREIGN PATENT DOCUMENTS

| | | |
|---|---|---|
| JP | 61-204034 A | 9/1986 |
| JP | 62-156393 A | 7/1987 |
| WO | 2007/101048 A2 | 9/2007 |

* cited by examiner

*Primary Examiner* — Ling Choi
*Assistant Examiner* — Jessica E Whiteley
(74) *Attorney, Agent, or Firm* — Thoburn T. Dunlap; Teresan W. Gilbert

(57) ABSTRACT

The present invention relates to hydrolytically stable multi-purpose polymers that are polymerized from a monomer mixture comprising: at least one amino-substituted meth(acrylate) (ASMA) monomer or salt thereof; and at least one nonionic vinyl (NIV) monomer, wherein the monomer mixture optionally comprises one or more of at least one vinyl associative (VA) monomer; at least one vinyl surfactant (VS) monomer; and/or at least one polymerizable silicone macromer (PSM) and wherein the monomer mixture further optionally comprises one or more of at least one crosslinking (XL) monomer; at least one chain transfer agent (CTA); and/or at least one polymeric stabilizer. The multi-purpose polymers of the present invention can also be prepared from monomer mixtures containing chain transfer agents or other functional components commonly utilized in polymerization process.

25 Claims, 8 Drawing Sheets

HYDROLYTICALLY STABLE MULTI-PURPOSE POLYMERS

FIELD OF THE INVENTION

The present invention relates to a multi-purpose polymers that are the polymerization product of a monomer mixture comprising: at least one amino-substituted meth(acrylate) (ASMA) monomer or salt thereof; and at least one nonionic vinyl (NIV) monomer, wherein the monomer mixture further comprises one or more of at least one vinyl associative (VA) monomer; at least one vinyl surfactant (VS) monomer; and/or at least one polymerizable silicone macromer (PSM) and wherein the monomer mixture further optionally comprises one or more of at least one crosslinking (XL) monomer; at least one chain transfer agent (CTA); and/or at least one polymeric stabilizer. The multi-purpose polymers of the present invention can also be prepared from monomer mixtures containing chain transfer agents or other functional components commonly utilized in polymerization processes. In one embodiment, the multi-purpose polymers of the present invention are hydrolytically stable over long periods of time (e.g., periods of time in excess of six months or more), provide surprisingly beneficial rheological properties in acidic aqueous compositions, and are compatible with cationic materials. The multi-purpose polymers of the present invention are useful in a variety of products including, but not limited to, personal care products, health care products, household care products, institutional and industrial care products, and industrial applications.

BACKGROUND OF THE INVENTION

Multi-purpose copolymers derived from, for example, the dimethylaminoethyl methacrylate (DMAEMA) monomer are known in the art. Such copolymers when produced from the afore-mentioned monomer can, in certain applications, have stability issue. As a result, such polymers have a poor shelf life and can start to "destabilize" after about six months. This in turn causes various logistic problems and undesirable performance degradation. The poor shelf life of these polymers is due to the amine backbone contained in the DMAEMA monomer which readily undergoes hydrolysis in an aqueous medium through "back-biting". The lone-pair electron on the nitrogen atom attacks the electron deficient carbonyl carbon to yield a five member ring Zwitterionic intermediate. Such a structure can then be easily hydrolyzed in the presence of water. The reaction scheme shown below summarizes the problem associated with copolymers that are derived from a DMAEMA monomer. As a result of the hydrolysis —COOH functional sites are produced on the backbone of a copolymer, as well as a dimethylaminoethanol by-product.

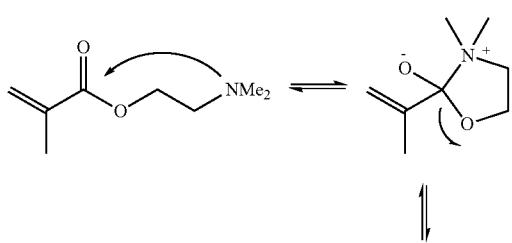

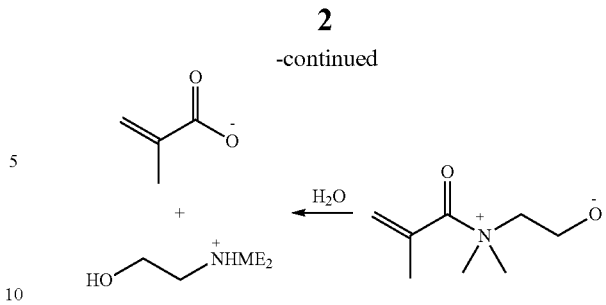

Given the above, there is a need in the art for hydrolytically stable multi-purpose copolymers that possess a suitable shelf life (e.g., in excess of six months or more).

SUMMARY OF THE INVENTION

The present invention relates to a multi-purpose polymers that are the polymerization product of a monomer mixture comprising: at least one amino-substituted meth(acrylate) (ASMA) monomer or salt thereof; and at least one nonionic vinyl (NIV) monomer, wherein the monomer mixture further comprises one or more of at least one vinyl associative (VA) monomer; at least one vinyl surfactant (VS) monomer; and/or at least one polymerizable silicone macromer (PSM) and wherein the monomer mixture further optionally comprises one or more of at least one crosslinking (XL) monomer; at least one chain transfer agent (CTA); and/or at least one polymeric stabilizer. The multi-purpose polymers of the present invention can also be prepared from monomer mixtures containing chain transfer agents or other functional components commonly utilized in polymerization processes. In one embodiment, the multi-purpose polymers of the present invention are hydrolytically stable over long periods of time (e.g., periods of time in excess of six months or more), provide surprisingly beneficial rheological properties in acidic aqueous compositions, and are compatible with cationic materials. The multi-purpose polymers of the present invention are useful in a variety of products including, but not limited to, personal care products, health care products, household care products, institutional and industrial care products, and industrial applications.

The multi-purpose polymers of the present invention may suitably comprise, consist of, or consist essentially of the components, elements, and process delineations described herein. The invention illustratively disclosed herein suitably may be practiced in the absence of any element which is not specifically disclosed herein.

Unless otherwise stated, all percentages, parts, and ratios expressed herein are based upon weight of the total compositions of the present invention, and all weights are expressed on the basis of 100 percent active ingredients.

In one embodiment, the present invention relates to a hydrolytically stable polymer that is the reaction product of a monomer mixture comprising monomers: (a), (b), and, optionally, a component selected from (c), (d), (e), (f), (g), (h), and mixtures thereof.

In another embodiment, the present invention relates to a hydrolytically stable polymer that is the reaction product of the polymerization of a monomer mixture comprising monomers:
(i) (a), (b) and (c);
(ii) (a), (b) and (d);
(iii) (a), (b) and (e);
(iv) (a), (b), (c) and (d);
(v) (a), (b), (c) and (e);
(vi) (a), (b), (d) and (e); or
(vii) (a), (b), (c), (d) and (e), where (a) is at least one amino-substituted meth(acrylate) (ASMA) monomer or salt thereof; (b) is at least one nonionic vinyl (NIV) monomer; (c) is at least one vinyl associative (VA) monomer; (d) is at least one vinyl surfactant (VS) monomer; (e) is at least one polymerizable silicone macromer (PSM), and wherein any of the above mixtures further optionally contain: (f) at least one crosslinking (XL) monomer; (g) at least one chain transfer agent (CIA); (h) at least one polymeric stabilizer; or any suitable combination of two or more of components (f), (g) and/or (h).

In another embodiment, the present invention relates to a hydrolytically stable polymer that is the reaction product of the polymerization of a monomer mixture comprising monomers:

(i) (a), (b) and (c);
(ii) (a), (b) and (d);
(iii) (a), (b) and (e);
(iv) (a), (b), (c) and (d);
(v) (a), (b), (c) and (e);
(vi) (a), (b), (d) and (e); or
(vii) (a), (b), (c), (d) and (e), where (a) is at least one amino-substituted meth(acrylate) (ASMA) monomer or salt thereof; (b) is at least one nonionic vinyl (NIV) monomer; (c) is at least one vinyl associative (VA) monomer; (d) is at least one vinyl surfactant (VS) monomer; (e) is at least one polymerizable silicone macromer (PSM), and wherein any of the above mixtures further comprises: (f) at least one crosslinking (XL) monomer; (g) at least one chain transfer agent (CTA); (h) at least one polymeric stabilizer; or any suitable combination of two or more of components (f), (g) and/or (h).

In still another embodiment, the present invention relates to a hydrolytically stable polymer that is the reaction product of the polymerization of a monomer mixture comprising monomers:

(i) (a), (b) and (c);
(ii) (a), (b) and (d);
(iii) (a), (b) and (e);
(iv) (a), (b), (c) and (d);
(v) (a), (b), (c) and (e);
(vi) (a), (b), (d) and (e); or
(vii) (a), (b), (c), (d) and (e), where (a) is at least one amino-substituted meth(acrylate) (ASMA) monomer or salt thereof; (b) is at least one nonionic vinyl (NIV) monomer; (c) is at least one vinyl associative (VA) monomer; (d) is at least one vinyl surfactant (VS) monomer; (e) is at least one polymerizable silicone macromer (PSM), and wherein any of the above mixtures further optionally contain: (f) at least one crosslinking (XL) monomer; (g) at least one chain transfer agent (CTA); (h) at least one polymeric stabilizer; or any suitable combination of two or more of components (f), (g) and/or (h), wherein the monomer mixture comprises, on a total monomer mixture weight basis about 1 weight percent to about 90 weight percent of component (a); about 20 weight percent to about 80 weight percent of component (b); about 0.01 weight percent to about 25 weight percent of component (c); about 0.01 weight percent to about 25 weight percent of component (d); about 0.01 weight percent to about 10 weight percent of component (e); up to about 5 weight percent of component (f); up to about 10 weight percent of component (g); and up to about 2 weight percent of component (h).

In still yet another embodiment, the present invention relates to a hydrolytically stable polymer that is the reaction product of the polymerization of a monomer mixture comprising monomers:

(i) (a), (b) and (c);
(ii) (a), (b) and (d);
(iii) (a), (b) and (e);
(iv) (a), (b), (c) and (d);
(v) (a), (b), (c) and (e);
(vi) (a), (b), (d) and (e); or
(vii) (a), (b), (c), (d) and (e), where (a) is at least one amino-substituted meth(acrylate) (ASMA) monomer or salt thereof; (b) is at least one nonionic vinyl (NIV) monomer; (c) is at least one vinyl associative (VA) monomer; (d) is at least one vinyl surfactant (VS) monomer; (e) is at least one polymerizable silicone macromer (PSM), and wherein any of the above mixtures further optionally contain: (f) at least one crosslinking (XL) monomer; (g) at least one chain transfer agent (CTA); (h) at least one polymeric stabilizer; or any suitable combination of two or more of components (f), (g) and/or (h), wherein the monomer mixture comprises, on a total monomer mixture weight basis about 0.10 weight percent to about 80 weight percent of component (a); about 20 weight percent to about 70 weight percent of component (b); about 0.1 weight percent to about 15 weight percent of component (c); about 0.1 weight percent to about 10 weight percent of component (d); about 0.1 weight percent to about 7.5 weight percent of component (e); about 0.01 up to about 5 weight percent of component (f); about 0.1 to about 10 weight percent of component (g); and 0.001 to about 2 weight percent of component (h).

DETAILED DESCRIPTION OF THE INVENTION

Figure 1:
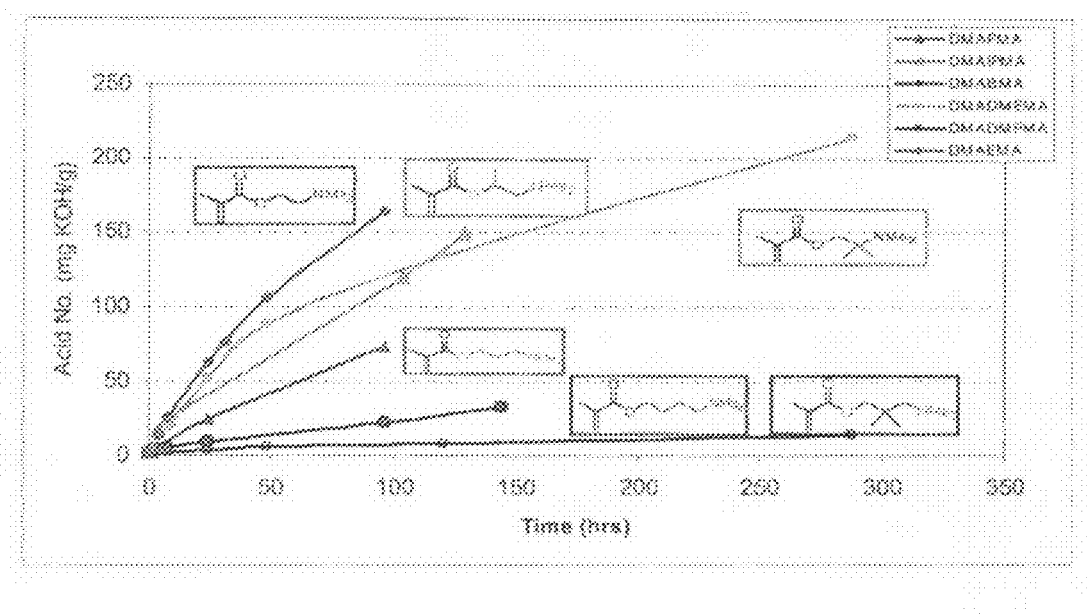
FIG. 1 is a plot of acid number versus time for various monomers when subjected to hydrolysis conditions.

The present invention relates to a multi-purpose polymers that are the polymerization product of a monomer mixture comprising: at least one amino-substituted meth(acrylate) (ASMA) monomer or salt thereof; and at least one nonionic vinyl (NIV) monomer, wherein the monomer mixture further comprises one or more of at least one vinyl associative (VA) monomer; at least one vinyl surfactant (VS) monomer; and/or at least one polymerizable silicone macromer (PSM) and wherein the monomer mixture further optionally comprises one or more of at least one crosslinking (XL) monomer; at least one chain transfer agent (CTA); and/or at least one polymeric stabilizer. The multi-purpose polymers of the present invention can also be prepared from monomer mixtures containing chain transfer agents or other functional components commonly utilized in polymerization processes. In one embodiment, the multi-purpose polymers of the present invention are hydrolytically stable over long periods of time (e.g., periods of time in excess of six months or more), provide surprisingly beneficial rheological properties in acidic aqueous compositions, and are compatible with cationic materials. The multi-purpose polymers of the present invention are useful in a variety of products including, but not limited to, personal care products, health care products, household care products, institutional and industrial care products, and industrial applications.

The polymers of the present invention are generally basic, insoluble, aqueous acid-swellable, or aqueous acid-soluble polymers, and salts thereof, which contain at least one basic amino substituent that is cationic at low pH and at least one hydrophobically modified polyoxyalkylene substituent derived from a vinyl associative (VA) monomer, and optionally at least one polyoxyalkylene substituent derived from a vinyl surfactant (VS) monomer. Furthermore, the polymer of the present invention can also optionally contain substituent groups derived from other monomer units, such as crosslinking monomer units, hydroxy-substituted nonionic vinyl monomer units, chain transfer agent units, polymeric stabilizers, and the like. The polymers of the present invention generally exhibit associative properties in aqueous solution. For convenience, the polymers of the present invention are generally referred to herein as "multi-purpose polymers." The term "low pH formulation" refers to formulations having an acidic pH in the range of about 0.5 to not more than about 7, or even to not more than about 6.5.

As used herein, the term "(meth)acrylic" acid is meant to include both acrylic acid and methacrylic acid. Similarly, the term "(meth)acrylate" as used herein is meant to include acrylates and methacrylates. The term (meth)acrylamide" is used to include both acrylamide and methacrylamide.

The term "aqueous" as applied to formulations or media means that water is present in an amount sufficient to at least swell or dissolve the multi-purpose polymer in the composition into which it is included.

It has been surprisingly discovered that the multi-purpose polymers of the present invention provide improved shelf life of about six months or more. Additionally, the multi-purpose polymers of the present invention provide desirable rheological properties to low pH aqueous personal care, health care, household care, and industrial and institutional care products. The multi-purpose polymers of the present invention are cationic compatible making them particularly useful as thickeners in products containing quaternary ammonium salts or amines. Surprisingly, the multi-purpose polymers of the present invention are useful in compositions containing one or more surfactants (e.g., anionic, cationic, amphoteric, nonionic, and/or combinations of any two or more thereof), and also provide hair setting efficacy. The multi-purpose polymers of the present invention are useful thickeners in products containing active acid components and are useful thickeners and emulsifiers for, emulsions (creams, lotions). In addition to thickening, the multi-purpose polymers of the present invention are useful film formers, spreading aids and deposition aids for products containing surfactants, colorants, hair and skin conditioners, silicones, polyquaternium compounds, anti-dandruff agents, anti-aging, anti-cellulite, anti-acne, vitamins, analgesics, anti-inflammatory compounds, self-tanning agents, hair growth promoting agents, UV protecting agents, skin lighteners, vegetable, plant and botanical extracts, antiperspirants, antioxidants, deodorants, hair fixative polymers, emollient oils, and combinations thereof.

The term "personal care products" as used herein includes, without being limited thereto, cosmetics, toiletries, cosmeceuticals and beauty aids, personal hygiene and cleansing products applied to the skin, hair, scalp, and nails of humans and animals. The term "health care products" as used herein includes, without being limited thereto, pharmaceuticals, pharmacosmetics, oral care products (mouth, teeth), eye care products, ear care products and over-the-counter products and appliances, such as patches, plasters, dressings and the like, and medical devices externally applied to or into the body of humans and animals for ameliorating a health-related or medical condition, for generally maintaining hygiene or well-being, and the like. The term "body" includes the keratinous (hair, nails) and non-keratinous skin areas of the entire body (face, trunk, limbs, hands and feet), the tissues of body openings and eyes, and the term "skin" includes the scalp and mucous membranes. The term "home care products" as used herein includes, without being limited thereto, products employed in a domestic household for surface cleaning or biocidal cleaning products for maintaining sanitary conditions, such as in the kitchen and bathroom, and laundry products for fabric care and cleaning, and the like. The term "institutional and industrial care" and "I&I," as used herein includes, without being limited thereto, products employed for cleaning or maintaining sanitary conditions in industrial and institutional, environments, including hospital and health care facilities, and the like.

The multi-purpose polymers of the present invention are hydrolytically stable multi-purpose polymers, which are, in one embodiment, prepared by polymerizing a mixture containing monomers:
    (i) (a), (b) and (c);
    (ii) (a), (b) and (d);
    (iii) (a), (b) and (e);
    (iv) (a), (b), (c) and (d);
    (v) (a), (b), (c) and (e);
    (vi) (a), (b), (d) and (e); or
    (vii) (a), (b), (c), (d) and (e),
where (a) is at least one amino-substituted meth(acrylate) (ASMA) monomer or salt thereof; (b) is at least one nonionic vinyl (NIV) monomer; (c) is at least one vinyl associative (VA) monomer; (d) is at least one vinyl surfactant (VS) monomer; (e) is at least one polymerizable silicone macromer (PSM), and wherein any of the above mixtures further optionally contain: (f) at least one crosslinking (XL) monomer; (g) at least one chain transfer agent (CTA); (h) at least one polymeric stabilizer; or any suitable combination of two or more of components (f), (g) and/or (h). The multi-purpose polymers of the present invention can also be prepared from monomer mixtures containing chain transfer agents or other functional components commonly utilized in polymerization processes.

In one embodiment, the inventive hydrolytically stable multi-purpose polymer of the present invention is the polymerization product of a monomer mixture comprising, on a total monomer mixture weight basis: (a) about 10 weight percent to about 90 weight percent of at least one ASMA monomer or a salt thereof; (b) about 20 weight percent to about 80 weight percent of at least one NIV monomer; (c) about 0.01 weight percent to about 25 weight percent of at least one VA monomer; (d) up to about 25 weight percent of at least one VS monomer; (e) about 0.01 weight percent to about 10 weight percent of at least one polymerizable silicone macromer (PSM); (f) up to about 5 weight percent of a XL monomer; (g) up to about 10 weight percent of a CTA; and (h) up to about 2 weight percent of a polymeric stabilizer.

In another embodiment, the multi-purpose polymer of the present invention is the polymerization product of a monomer mixture comprising, on a total monomer mixture weight basis: (a) about 10 weight percent to about 80 weight percent of at least one ASMA monomer or a salt thereof; (b) about 20 weight percent to about 70 weight percent of at least one NIV monomer; (c) about 0.1 weight percent to about 15 weight percent of at least one V monomer; (d) about 0.1 weight percent to about 10 weight percent of at least one VS monomer; (e) about 0.1 weight percent to about 7.5 weight percent of at least one polymerizable silicone macromer (PSM); (f) about 0.001 weight percent to about 5 weight percent of a XL monomer; and (g) about 0.1 weight percent to about 5 weight percent of a CTA. Here, as well as elsewhere in the specification end claims, individual numerical values, or limits, can be combined to form additional non-disclosed and/or non-stated ranges.

In still another embodiment, the multi-purpose polymers of the present invention are polymers that are the product of polymerization of a monomer mixture comprising, on a total monomer mixture weight basis: (a) about 20 weight percent to about 70 weight percent of at least one amino-substituted meth(acrylate) (ASMA) monomer selected from one or more monomers represented by Formulas (I), I(a), and/or (II) below:

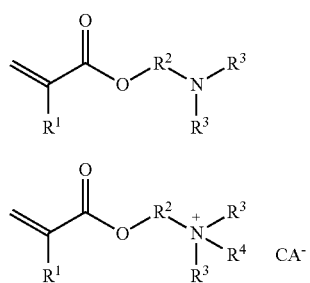

where $R^1$, $R^2$, $R^3$ and $R^4$ are as defined below, and $CA^-$ is a counter-anion suitable to balance the charge on the quaternary ammonium moiety; (b) about 50 weight percent to about 65 weight percent of at least one nonionic vinyl (NIV) monomer selected from $C_1$ to $C_{30}$ alkyl ester of acrylic acid, a $C_1$ to $C_{30}$ alkyl ester of methacrylic acid, or any suitable mixture of two or more thereof; (c) about 0.1 weight percent to about 10 weight percent of at least one vinyl associative (VA) monomer selected from cetyl polyethoxylated methacrylate (CEM), cetearyl polyethoxylated methacrylate (CSEM), stearyl polyethoxylated (meth)acrylate, arachidyl polyethoxylated (meth)acrylate, behenyl polyethoxylated methacrylate (BEM), lauryl polyethoxylated methacrylate (LEM), cerotyl polyethoxylated (meth)acrylate, monthanyl polyethoxylated (meth)acrylate, melissyl polyethoxylated (meth) acrylate, lacceryl polyethoxylated (meth)acrylate, tristyryl phenolpolyethoxylated methacrylate (TEM), hydrogenated castor oil polyethoxylated methacrylate (HCOEM), canola polyethoxylated (meth)acrylate, and cholesterol polyethoxylated methacrylate (CHEM); (d) about 0.1 weight percent to about 10 weight percent of at least one vinyl surfactant (VS) monomer represented by Formula (VI):

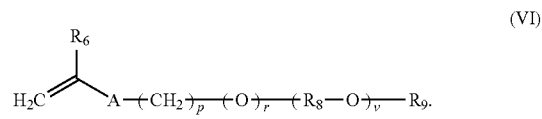

where each $R_6$ is independently hydrogen or methyl, —C(O)OH, or —C(O)$OR_7$; $R_7$ is $C_1$ to $C_{30}$ alkyl; A is —$CH_2$C(O)O—, —C(O)O—, —O—, or —$CH_2$O—; p is an integer in the range of 0 to about 30, and r is 0 or 1, with the proviso that when p is 0, r is 0, and when p is in the range of 1 to about 30, r is 1; $(R_8$—O$)_v$ is a polyoxyalkylene, which is a homopolymer, a random copolymer or a block copolymer of $C_2$ to $C_4$ oxyalkylene units, wherein each $R_8$ is independently $C_2H_4$, $C_3H_6$, $C_4H_8$, or a mixture thereof, and v is an integer in the range of about 1 to about 250, or from about 5 to about 100, or from about 10 to about 80, or even from about 15 to about 60; and $R_9$ is hydrogen or $C_1$ to $C_4$ alkyl; (e) about 1 weight percent to about 7.5 weight percent of at least one polymerizable silicone macromer (PSM); (f) up to about 5 weight percent of a crosslinking (XL) monomer; (g) up to about 10 weight percent of a chain transfer agent (CTA); and (h) up to about 2 weight percent of a polymeric stabilizer. Here, as well as elsewhere in the specification and claims, individual numerical values, or limits, from various separate embodiments can be combined to form additional non-disclosed and/or non-stated ranges.

As used herein the term "alkyl" means a substituted or unsubstituted aliphatic hydrocarbon moiety including linear, branched and carbocyclic alkyl moieties. The term "carbocyclic alkyl" means an alkyl group comprising one or more carbocyclic rings of from 3 to about 12 carbon atoms in size and optionally including alkyl substituents on the carbocyclic ring. The term "aryl" includes substituted and unsubstituted phenyl and naphthyl moieties. Modifiers of the form "$C_x$-$C_y$" designate that the alkyl or carbocyclic alkyl groups have molecular formulas containing a total of x to y carbon atoms, where x and y are specified integers. As used herein and in the appended claims, the term "complex ester" means a di-, tri-, or poly-ester of a polyol such as a sugar, having at least one hydroxyl group capable of being alkylated with a $C_2$ to $C_7$ alkylene oxide. The term "complex ester" includes, in one instance the complex hydrophobes described in U.S. Pat. No. 5,639,841, the relevant disclosure of which is incorporated herein by reference.

The terms "halogen-substituted," "hydroxy-substituted," "carboxy-substituted," "polyoxyalkylene-substituted," "alkyl-substituted," and "aryl-substituted" as used herein in reference to alkyl or aryl groups, and the like, mean that at least one hydrogen atom on an alkyl, aryl, or like group has been replaced by at least one halogen atom, hydroxyl group, carboxyl group, polyoxyalkylene group, alkyl group, or aryl group, respectively. The terms "poly(meth)acrylate" and "poly(meth)acrylamide" as used herein refer in the alternative to polyacrylate or polymethacrylate, and to polyacrylamide or polymethacrylamide, respectively.

Suitable monomers useful in the preparation of the multi-purpose polymers of the present invention are described below. Regarding the monomers, the monomer mixtures, and the amount of each component of the "charges" utilized to form the multi-purpose polymers of the present invention, the following should be noted. Although the total amount of each monomer or component of a various "charge" may individually total more then 100 weight percent when each component is taken individually and totaled using the broadest amounts disclosed herein, one of skill in the art will realize that this is not the case. Rather, each individual component (i.e., components (a) through (e) inclusive and, if present, components (f), and (g)) of a various reaction "charge" of the present invention can be varied within any stated range as desired in order to achieve a total weight percent of 100.

ASMA Monomer:

Amino-substituted meth(acrylate) (ASMA) monomers suitable for the preparation of the inventive multi-purpose polymers are basic, polymerizable, ethylenically unsaturated monomers that contain at least one amino functional group. These basic amino groups can be derived from mono-, di- or poly-amino alkyl groups or nitrogen containing heteroaromatic groups. The amino group can comprise primary, secondary or tertiary amines. The monomers can be used in the amino form or in the salt form, as desired.

The polymers of the present invention include, in one embodiment, one or more ASMA monomers selected from the monomers represented by Formulas (I) and (II) shown below:

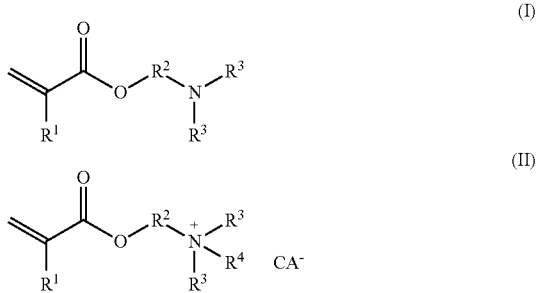

where $R^1$ is methyl; where $R^2$ is a substituted or unsubstituted, linear or branched $C_2$ to $C_8$ alkanediyl group (i.e., an alkane group having at least two free valencies), with the proviso that when $R^2$ has two carbons at least one of the two carbon atoms of the $R^2$ group is substituted (e.g., mono-substituted or di-substituted) with a linear or branched $C_1$ to $C_{30}$ alkyl group; where each $R^3$ is independently selected from hydrogen, linear or branched $C_1$ to $C_{30}$ alkyl groups, linear or branched $C_1$ to $C_{30}$ alkyl groups that contain one or more heteroatoms, linear or branched $C_2$ to $C_{20}$ alkenyl groups, linear or branched $C_2$ to $C_{30}$ alkenyl groups that contain one or more heteroatoms, linear or branched $C_2$ to $C_{30}$ alkynyl groups, linear or branched $C_2$ to $C_{30}$ alkynyl groups that contain one or more heteroatoms, $C_4$ to $C_{20}$ aryl groups, $C_4$ to $C_{20}$ aryl groups that contain one or more heteroatoms, $C_4$ to $C_{20}$ cycloalkyl groups, $C_4$ to $C_{20}$ cycloalkyl groups that contain one or more heteroatoms, $C_4$ to $C_{20}$ heterocyclic groups, or where both $R^3$ substituents and the nitrogen atom to which they are attached can form a saturated or unsaturated $C_2$ to $C_{20}$ heterocyclic group or a saturated or unsaturated $C_2$ to $C_{20}$ heterocyclic group having two or more heteroatoms, where the heteroatoms, if present, are selected from a carbonyl group, N, S, P or O; $R^4$ is a linear or branched $C_1$ to $C_{30}$ alkyl group; and where $CA^-$ is a counter-anion suitable to balance the charge on the quaternary ammonium moiety. In another embodiment, $R^1$ is methyl; where $R^2$ is a substituted or unsubstituted, linear or branched $C_3$ to $C_7$ alkanediyl group (i.e., an alkane group having at least two free valencies); where each $R^3$ is independently selected from hydrogen, linear or branched $C_3$ to $C_{15}$ alkyl groups, linear or branched $C_3$ to $C_{15}$ alkyl groups that contain one or more heteroatoms, linear or branched $C_4$ to $C_{20}$ alkenyl groups, linear or branched $C_4$ to $C_{20}$ alkenyl groups that contain one or more heteroatoms, linear or branched $C_4$ to $C_{20}$ alkynyl groups, linear or branched $C_4$ to $C_{20}$ alkynyl groups that contain one or more heteroatoms, $C_5$ to $C_{10}$ aryl groups, $C_5$ to $C_{10}$ aryl groups that contain one or more heteroatoms, $C_5$ to $C_{10}$ cycloalkyl groups, $C_5$ to $C_{10}$ cycloalkyl groups that contain one or more heteroatoms, $C_5$ to $C_{10}$ heterocyclic groups, or where both $R^3$ substituents and the nitrogen atom to which they are attached can form a saturated or unsaturated $C_3$ to $C_{10}$ heterocyclic group or a saturated or unsaturated $C_3$ to $C_{10}$ heterocyclic group having two or more heteroatoms, where the heteroatoms, if present, are selected from a carbonyl group, N, S, P or O; $R^4$ is a linear or branched $C_2$ to $C_{20}$ alkyl group; and where $CA^-$ is a counter-anion suitable to balance the charge on the quaternary ammonium moiety. Here, as well as elsewhere in the specification and claims, individual numerical values (including carbon atom numerical values), or limits, can be combined to form additional non-disclosed and/or non-stated ranges.

In still another embodiment, $R^1$ is methyl; $R^2$ is a substituted or unsubstituted, linear or branched $C_4$ to $C_6$ alkanediyl group (i.e., an alkane group having at least two free valencies); each $R^3$ is independently selected from hydrogen, linear or branched $C_5$ to $C_8$ alkyl groups, linear or branched $C_5$ to $C_8$ alkyl groups that contain one or more heteroatoms, linear or branched $C_6$ to $C_{10}$ alkenyl groups, linear or branched $C_6$ to $C_{10}$ alkenyl groups that contain one or more heteroatoms, linear or branched $C_8$ to $C_{10}$ alkynyl groups, linear or branched $C_6$ to $C_{10}$ alkynyl groups that contain one or more heteroatoms, $C_5$ to $C_8$ aryl groups, $C_5$ to $C_8$ aryl groups that contain one or more heteroatoms, $C_5$ to $C_8$ cycloalkyl groups, $C_5$ to $C_8$ cycloalkyl groups that contain one or more heteroatoms, $C_5$ to $C_8$ heterocyclic groups, or where both $R^3$ substituents and the nitrogen atom to which they are attached can form a saturated or unsaturated $C_4$ to $C_8$ heterocyclic group or a saturated or unsaturated $C_4$ to $C_8$ heterocyclic group having two or more heteroatoms, where the heteroatoms, if present, are selected from a carbonyl group, N, S, P or O; and where $R^4$ is a linear or branched $C_3$ to $C_{15}$ alkyl group; and where $CA^-$ is a counter-anion suitable to balance the charge on the quaternary ammonium moiety. Here, as well as elsewhere in the specification and claims, individual numerical values (including carbon atom numerical values), or limits, can be combined to form additional non-disclosed and/or non-stated ranges.

Regarding the compounds of Formula (II), these compounds are the corresponding quaternary ammonium compounds of the compounds represented by Formula (I). As would be apparent to those of skill in the art, the monomer compounds of Formula (II) are produced by subjecting a compound represented by Formula (I) to quaternization reaction with a alkyl halide compound of the formula $CA-R^4$ where $R^4$ is a linear or branch alkyl group as defined above and where CA is any suitable species and/or moiety that yields a counter-anion when reacted to form the quaternary ammonium compounds of the compounds represented by Formula (II). In one embodiment, suitable species and/or moieties for CA and/or $CA^-$ include, but are not limited to, halogens (e.g., bromine, chlorine, fluorine or iodine), sulfate, sulfonate, phosphate, and phosphonate. In another embodiment, suitable species and/or moieties for CA and/or $CA^-$ include, but are not limited to, chloride, bromide, methosulfate (i.e., methylsulfate), acetate, formate, sulfate, nitrate, and the like. In still another embodiment CA and/or CA⁻ is a halogen such as chlorine, bromine or fluorine.

In still another embodiment, the monomers of Formula (I) can be reacted with hydrogen peroxide ($H_2O_2$) to yield an amine oxide compound represented by the following Formula:

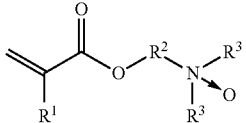

(Ia)

where $R^1$, $R^2$ and $R^3$ are as defined above. Additionally, either of the above-mentioned the conversion processes from Formula (I) to Formula (II) or the above amine oxide can be done after the multi-purpose polymers of the present invention have been made.

In another embodiment, the ASMA monomer charge is a mixture of compounds according to Formula (I) and (II). In one instance, the weight ratio of the amount of monomer according to Formula (I) to quaternary monomer according to Formula (II) is in the range of from about 5:95 to about 95:5, or from about 10:90 to 90:10, or from about 15:85 to 85:15, or from about 20:80 to about 80:20, or from about 25:75 to about 75:25, or from about 30:70 to 70:30, or from about 35:65 to 65:35, or from about 40:60 to about 60:40, or from about 45:55 to about 55:45, or even about 50:50. Here, as well as elsewhere in the specification and claims, individual numerical values, or limits, can be combined to form additional non-disclosed and/or non-stated ranges.

As used throughout the specification and claims, the term "alkanediyl" is defined to mean an alkane group having at least two free valencies. The free valencies can be located at a terminal position(s) on the radical and/or situated on any carbon atom in the backbone of the radical. For illustrative purposes non-limiting examples of linear and branched alkanediyl moieties are (the lines attached to only a single carbon atom represent a free valence):

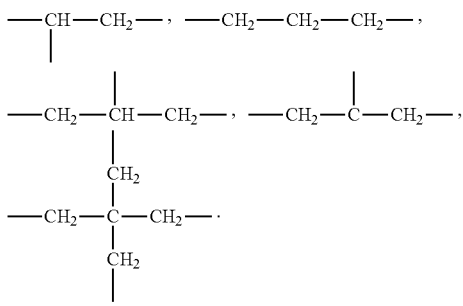

Examples of particular ASMA monomers include, but are not limited to, those shown below:

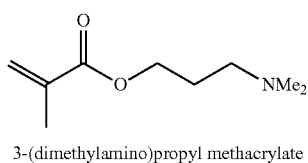

3-(dimethylamino)propyl methacrylate

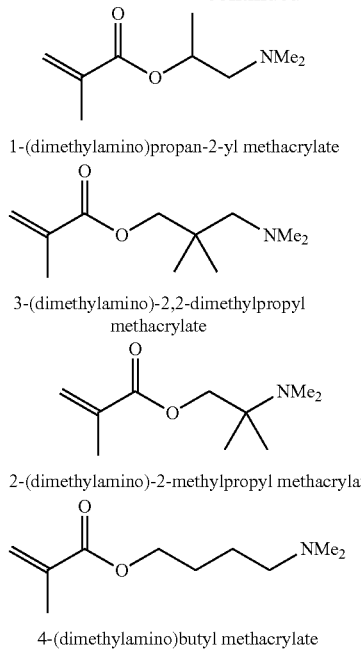

1-(dimethylamino)propan-2-yl methacrylate 3-(dimethylamino)-2,2-dimethylpropyl methacrylate 2-(dimethylamino)-2-methylpropyl methacrylate 4-(dimethylamino)butyl methacrylate where the above compounds can be represented by the following acronyms 3-(dimethylamino)propyl methacrylate (DMAPMA); 2-(dimethylamino)propan-2-yl methacrylate (DMAIPMA); 3-(dimethylamino)-2,2-dimethylpropyl methacrylate (DMADMPMA); 2-(dimethylamino)-2-methylpropyl methacrylate (DMAMPMA); and 4-(dimethylamino)butyl methacrylate (DMABMA).

Suitable salt forms of the above monomers include, but are not limited to, mineral acid salts such as the hydrochloride, sulfate, and phosphate salts; and organic acid salts such as the acetate, citrate, glycolate, lactate, maleate, and fumarate salts; and the like.

The foregoing monomers or salts thereof can be used as the amino-substituted vinyl monomer component of the inventive multi-purpose polymers, individually, or in mixtures of two or more.

In one embodiment, the ASMA monomer comprises about 5 weight percent to about 90 weight percent, or from about 10 weight percent to about 80, or from about 15 weight percent to about 70 weight percent, or from about 20 weight percent to about 60 weight percent, or from about 25 weight percent to about 50 weight percent, or even from about 30 weight percent to about 40 weight percent, based on a total monomer mixture weight basis. Here, as well as elsewhere in the specification and claims, individual numerical values (including carbon atom numerical values), or limits, can be combined to form additional non-disclosed and/or non-stated ranges.

Due to the use of an ASMA monomer selected from Formula (I), I(a), and/or (II) shown above, the polymers of the present invention utilize one or more hydrolytically stable amine monomer for producing multi-purpose copolymers with improved shelf lives. As mentioned above, the multi-purpose copolymers of the present invention have a shelf life of at least about six months, at least about nine months, at least about 12 months, at least about 18 months, or even a shelf life of at least about 24 months or longer. Here, as well as elsewhere in the specification and claims, individual numerical values (including carbon atom numerical values), or limits, can be combined to form additional non-disclosed and/or non-stated ranges.

By "shelf life" it is meant that the multi-purpose copolymers of the present invention remain stable even when in an aqueous solution, or environment, and do not undergo excess degradation due to the hydrolysis reaction discussed above.

While not wishing to be bound to any one theory, it is believed that the multi-purpose copolymers of the present invention remain stable even when in an aqueous solution, or environment, and do not undergo excess degradation due to the hydrolysis reaction discussed above due to a number of factors including, but not limited to, an extended chain length (linear and branched) between the amino functionality, or functionalities, and the acrylate functionality. In still another embodiment, surprisingly it has been found that hydrolysis can be mitigated and/or eliminated in the ester moiety of the amino-ester portion of a multi-purpose polymer formed in accordance with the various embodiments of the present invention by utilizing an $R^2$ group containing branching and/or an extended $R^2$ in accordance with the embodiments stated above. It is believed that this reduces the tendency for the formation of the five member ring intermediate detailed above in the hydrolysis reaction. Concurrently, this approach also increases the hydrophobicity of the monomer and decreases its solubility in water. Surprisingly, the combination of both these approaches (increasing the chain length and hydrophobicity of the ASMA monomer molecule) offer unexpected stability performance in multi-purpose copolymers formed therefrom in accordance with the present invention. Additionally, "protection" of the terminal vinyl ester group by substitution of the interior hydrogen atom with a linear or branch alkyl group as discussed above with regard to Formulas (I) and (II) also offers improved and unexpected stability in an multi-purpose copolymer formed therefrom in accordance with the present invention.

The ASMA monomers of the present invention can be utilized to mitigate the hydrolytic instability inherent in polymers that comprise repeating units polymerized from dimethylaminoethyl methacrylate (DMAEMA). The ASMA monomers of the invention can be incorporated into the polymerizable monomer mixture that comprises the DMAEMA monomer to mitigate the hydrolytic instability of polymers containing DMAEMA derived repeating units. In one aspect of the invention, the amount of ASMA monomer that can be included in the polymerizable DMAEMA containing monomer mixture ranges from about 1 to 99 parts by weight of the ASMA monomer(s) to about 99 to 1 parts by weight of the DMAEMA monomer based on 100 parts by Weight of the combined weight of the ASMA monomer(s) and the DMAEMA monomer. In another-aspect, the monomer mixture contains from about 10 to 90 parts by weight of the ASMA monomer(s) and about 90 to 10 parts by weight of the DMAEMA monomer. In a further aspect the monomer mixture contains from about 20 to 80 parts by weight of the ASMA monomer(s) and about 80 to 20 parts by weight of the DMAEMA monomer. In yet another aspect the monomer mixture contains from about 30 to 70 parts by weight of the ASMA monomer(s) and about 70 to 30 parts by weight of the DMAEMA monomer. In a still further aspect the monomer mixture contains from about 40 to 60 parts by weight of the ASMA monomer(s) and about 60 to 40 parts by weight of the DMAEMA monomer. In yet a further aspect the monomer mixture contains from about 50 parts by weight of the ASMA monomer(s) and about 50 parts by weight of the DMAEMA monomer. All of the foregoing aspects are based on 100 parts by weight of the combined weight of the ASMA monomer(s) and the DMAEMA monomer. Other polymerizable monomers can be incorporated into the polymerizable monomer mixture, such as, for example, one or more of the NIV, V, VS, PSM, and XL monomers described hereinabove.

Suitable ASMA monomers useful in mitigating the adverse hydrolytic susceptibility of DMAEMA derived polymers include one or more ASMA monomers conforming to formulae I, I(a), and II described above. Representative ASMA monomers are selected from 3-(dimethylamino)propyl methacrylate (DMAPMA); 2-(dimethylamino)propan-2-yl methacrylate (DMAIPMA); 3-(dimethylamino)-2,2-dimethylpropyl methacrylate (DMADMPMA); 2-(dimethylamino)-2-methylpropyl methacrylate (DMAMPMA); and 4-(dimethylamino)butyl methacrylate (DMABMA). The monomers conforming to formulae I, I(a), and II and the particular representative monomers disclosed herein can be utilized in the amounts and ranges set forth immediately above.

Nonionic vinyl (NIV) monomers suitable for use in the preparation of the inventive multi-purpose polymers are co-polymerizable, nonionic, ethylenically unsaturated monomers represented by Formulas (III) and/or (IV):

$$C(X)_2\!=\!C(X)Z \qquad\qquad (III)$$

$$CH_2\!=\!CH\!-\!OC(O)R_1 \qquad\qquad (IV)$$

wherein, in each of Formulas (III) and (IV), each X is independently hydrogen, methyl, —CH$_2$C(O)OR$_1$, —C(O)OR$_1$; and Z is —C(O)OR$_1$, —C$_6$H$_4$R$_1$, —C$_6$H$_4$OR$_1$, —CN, —C(O)N(R$_1$)$_2$, —NHC(O)CH$_3$, —NHC(O)H, —C(O)OA'OR$_{15}$, N-(2-pyrrolidonyl), N-caprolactamyl, —C(O)NHCH$_2$CH$_2$—N-ethyleneurea, or —C(O)NHC(CH$_3$)$_3$; A' is a divalent radical selected from —CH$_2$CH(OH)CH$_2$— and —CH$_2$CH(CH$_2$OH)—, each R$_1$ is independently linear and branched C$_1$ to C$_{30}$ alkyl, hydroxy-substituted C$_2$ to C$_{30}$ alkyl, C$_5$ to C$_{30}$ cycloalkyl, and C$_1$ to C$_5$ alkyl-substituted C$_5$ to C$_{30}$ cycloalkyl; R$_{15}$ is an acyl residue of a linear or branched, saturated or unsaturated C$_6$ to C$_{22}$ fatty acid.

Non-limiting examples of suitable nonionic vinyl monomers include C$_1$ to C$_{30}$ alkyl(meth)acrylates; C$_1$ to C$_{30}$ alkyl (meth)acrylamides; styrene; substituted styrenes such as vinyl toluene, (e.g., 2-methyl styrene), butyl styrene, isopropyl styrene, and the like; vinyl esters such as vinyl acetate, vinyl butyrate, vinyl pivalate, vinyl hexanoate, vinyl caprolate, vinyl nonanoate, vinyl decanoate, vinyl neodecanoate, vinyl undecanoate, vinyl laurate, and the like; unsaturated nitriles such as methacrylonitrile, acrylonitrile, and monomers that are available under the trade names of ACE™ and (M)ACE™ monomers from Hexion Specialty Chemicals, Inc., Columbus, Ohio.

The ACE monomer (CAS No. 94624-09-06) is the reaction product of glycidyl t-decanoate (CAS No. 71206-09-2) and acrylic acid. The (M)ACE Monomer is synthesized by reacting glycidyl t-decanoate and methacrylic acid. Other monomers set forth under Formula (III) wherein Z is —C(O)OA'OR$_{15}$ can be synthesized via esterification by reacting glycidol with a C$_6$ to C$_{22}$ fatty acid to obtain the glycidyl ester of the respective fatty acid(s). The so-formed glycidyl ester can in turn be reacted through its epoxy functionality with the carboxyl moiety of (meth)acrylic acid to obtain a preformed monomer.

In one aspect of the invention, suitable glycidyl esters for forming the preformed monomer components (ACE and (M)ACE)) described above are disclosed in U.S. Pat. No. 5,179,157 (column 13), the relevant disclosure of which is herein incorporated by reference. A glycidyl ester of neodecanoic acid and isomers thereof are commercially available under the trade name Cardura™ E10P from Hexion Specialty Chemicals, Inc.

In another embodiment, nonionic vinyl (NIV) monomers include $C_1$ to $C_{30}$ alkyl esters of acrylic acid and of methacrylic acid and mixtures thereof, such as methyl acrylate (MA), ethyl acrylate (EA), methyl methacrylate (MMA), n-butyl acrylate (nBA), 2-ethylhexyl acrylate (2-EHA), 3,3,5-trimethylcyclohexyl methacrylate (TMCHMA), stearyl methacrylate (SMA), and suitable mixtures of any two or more thereof.

In still another embodiment, suitable nonionic vinyl (NIV) monomers for use in conjunction with the present invention include, but are not limited to, vinyl monomers that include $C_1$ to $C_{30}$ alkyl esters of acrylic acid and of methacrylic acid, hydroxy $C_2$ to $C_{30}$ alkyl esters of acrylic acid and methacrylic acid, and mixtures of any two or more thereof. Examples of which include, but are not limited to, methyl acrylate (MA), ethyl acrylate (EA), methyl methacrylate (MMA), n-butyl acrylate (nBA), 2-ethylhexyl acrylate (2EHA), and stearyl methacrylate (SMA); unsaturated $C_1$ to $C_{30}$ dialkyl dicarboxylates such as diethyl itaconate; vinyl esters such as vinyl neodecanoate, vinyl nonoate, and vinyl undecanoate; N-vinyl pyrrolidone; $C_1$ to $C_{30}$ alkyl(meth)acrylamides such as methacrylamide and t-butyl methacrylamide; styrene; carbocyclic $C_1$ to $C_{30}$ alkyl substituted methacrylates such as cyclohexyl methacrylates, and 3,3,5-trimethylcyclohexyl methacrylate (TMCHMA), and suitable mixtures of any two or more thereof.

In one embodiment, the NIV monomer comprises about 0.01 weight percent to about 90 weight percent, or from about 0.1 weight percent to about 85 weight percent, or from about 1 weight percent to about 80 weight percent, or from about 5 weight percent to about 75 weight percent, or from about 10 weight percent to about 70 weight percent, or from about 15 weight percent to about 65 weight percent, or from about 20 weight percent to about 60 weight percent, or from about 25 weight percent to about 55 weight percent, or from about 30 weight percent to about 50 weight percent, or even from about 35 weight percent to about 45 weight percent, based on a total monomer mixture weight basis. Here, as well as elsewhere in the specification and claims, individual numerical values (including carbon atom numerical values), or limits, can be combined to form additional non-disclosed and/or non-stated ranges.

In still another embodiment, the inventive multi-purpose polymers can be prepared from monomer mixtures containing NIV monomers that are ethylenically unsaturated monomers comprising one or more hydroxyl substituents. Examples of suitable NIV monomers of this type include, but are not limited to, a hydroxy-substituted ($C_1$ to $C_4$)alkyl (meth)acrylate such as 2-hydroxyethyl methacrylate (HEMA), 2-hydroxyethyl acrylate (2-HEA), 3-hydroxypropyl acrylate, and the like; a hydroxy-substituted ($C_1$ to $C_4$)alkyl(meth)acrylamide such as N-(2-hydroxyethyl)methacrylamide, N-(2-hydroxyethyl)acrylamide, N-(3-hydroxypropyl)acrylamide, dihydroxypropyl)acrylamide, and the like. Other useful NIV monomers include allyl alcohol, glycerol monoallyl ether, 3-methyl-3-buten-1-ol, and vinyl alcohol precursors and equivalents, such as vinyl acetate.

In one embodiment, the monomer reaction mixture of the present invention contains, in one embodiment, one or more of any of the NIV monomers disclosed above in amounts up to about 15 weight percent based on the total monomer mixture weight. In a another embodiment, the amount of NIV monomer in the mixture is in the range of about 0.01 weight percent to about 15 weight percent, or from about 0.1 weight percent to about 10 weight percent, or from about 1 weight percent to about 8 weight percent, or even from about 1 weight percent to about 5 weight percent, based on a total monomer mixture weight basis. Here, as well as elsewhere in the specification and claims, individual numerical values (including carbon atom numerical values), or limits, can be combined to form additional non-disclosed and/or non-stated ranges.

VA Monomer:

Vinyl associative monomers (VA) suitable for use in the production of the multi-purpose polymers of the present invention are compounds that in one embodiment have: (A) an ethylenically unsaturated end group portion for addition polymerization with the other monomers of the system; (B) a polyoxyalkylene midsection portion for imparting selective hydrophilic properties to the product polymer; and (C) a hydrophobic end group portion for providing selective hydrophobic properties to the polymer.

The portion (A) supplying the ethylenically unsaturated end group is, in one embodiment, derived from an $\alpha,\beta$-ethylenically unsaturated mono or di-carboxylic acid or the anhydride thereof, or even a $C_3$ or $C_4$ mono- or di-carboxylic acid or the anhydride thereof. Alternatively, portion (A) of the vinyl associative (VA) monomer can be derived from an allyl ether or vinyl ether; a nonionic vinyl-substituted urethane monomer, such as disclosed in U.S. Reissue Pat. No. 33,156 or U.S. Pat. No. 5,294,692; or a vinyl-substituted urea reaction product such as disclosed in U.S. Pat. No. 5,011,978; the relevant disclosures of which are incorporated herein by reference.

The midsection portion (B) is, in one embodiment, a polyoxyalkylene segment of about 5 to about 250, or from about 10 to about 120, or even from about 15 to about 60 repeating $C_2$ to $C_7$ alkylene oxide units. In one embodiment, midsection portions (B) include polyoxyethylene, polyoxypropylene, and polyoxybutylene segments comprising about 5 to about 150, or from about 10 to about 100, or even from about 15 to about 60 ethylene, propylene or butylene oxide units, and random or non-random sequences of ethylene oxide, propylene oxide and or butylene oxide units. Here, as well as elsewhere in the specification and claims, individual numerical values (including carbon atom numerical values), or limits, can be combined to form additional non-disclosed and/or non-stated ranges.

The hydrophobic end group portion (C) of the vinyl associative (VA) monomers is, in one embodiment, a hydrocarbon moiety belonging to one of the following hydrocarbon classes: a $C_8$ to $C_{40}$ linear alkyl, an aryl-substituted $C_2$ to $C_{40}$ alkyl, a $C_2$ to $C_{40}$ alkyl-substituted phenyl, a $C_8$ to $C_{40}$ branched alkyl, a $C_8$ to $C_{40}$ carbocyclic alkyl; and a $C_8$ to $C_{80}$ complex ester.

Non-limiting examples of suitable hydrophobic end group portions (C) of the vinyl associative (VA) monomers are linear or branched alkyl groups having about 8 to about 40 carbon atoms such as capryl ($C_8$), isooctyl (branched $C_8$), decyl ($C_{10}$), lauryl ($C_{12}$), myristyl ($C_{14}$), cetyl ($C_{16}$), cetearyl ($C_{16}$ to $C_{18}$), stearyl ($C_{18}$), isostearyl (branched $C_{18}$), arachidyl ($C_{20}$), behenyl ($C_{22}$), lignoceryl ($C_{24}$), cerotyl ($C_{26}$), montanyl ($C_{28}$), melissyl ($C_{30}$), lacceryl ($C_{32}$), and the like.

Examples of linear and branched alkyl groups having about 8 to about 40 carbon atoms that are derived from a natural source include, but are not limited to, alkyl groups derived from hydrogenated peanut oil, soybean oil and canola oil (all predominately $C_{18}$), hydrogenated tallow oil ($C_{16}$ to $C_{18}$), and the like; and hydrogenated $C_{10}$ to $C_{30}$ terpenols, such as hydrogenated geraniol (branched $C_{10}$), hydrogenated farnesol (branched $C_{15}$), hydrogenated phytol (branched $C_{20}$), and the like.

Non-limiting examples of suitable $C_2$ to $C_{40}$ alkyl-substituted phenyl groups include octylphenyl, nonylphenyl, decylphenyl, dodecylphenyl, hexadecylphenyl, octadecylphenyl, isooctylphenyl, sec-butylphenyl, and the like.

Suitable $C_8$ to $C_{40}$ carbocylic alkyl groups include, without being limited thereto, groups derived from sterols from animal sources, such as cholesterol, lanosterol, 7-dehydrocholesterol, and the like; from vegetable sources, such as phytosterol, stigmasterol, campesterol, and the like; and from yeast sources, such as ergosterol, mycosterol, and the like. Other carbocyclic alkyl hydrophobic end groups useful in the present invention include, without being limited thereto, cyclooctyl, cyclododecyl, adamantyl, decahydronaphthyl, and groups derived from natural carbocyclic materials such as pinene, hydrogenated retinol, camphor, isobornyl alcohol, and the like.

Exemplary aryl-substituted $C_2$ to $C_{40}$ alkyl groups include, but are not limited to, styryl (e.g., 2-phenylethyl), distyryl (e.g., 2,4-diphenylbutyl), tristyryl (e.g., 2,4,6-triphenylhexyl), 4-phenylbutyl, 2-methyl-2-phenylethyl, tristyrylphenolyl, and the like.

Non-limiting examples of suitable $C_8$ to $C_{80}$ complex esters include, but are not limited to, hydrogenated castor oil (predominately the triglyceride of 12-hydroxystearic acid); 1,2-diacyl glycerols such as 1,2-distearyl glycerol, 1,2-dipalmityl glycerol, 1,2-dimyristyl glycerol, and the like; di-, tri-, or poly-esters of sugars such as 3,4,6-tristearyl glucose, 2,3-dilauryl fructose, and the like; and sorbitan esters such as those disclosed in U.S. Pat. No. 4,600,761, the relevant disclosures of which are incorporated herein by reference.

Useful monomers can be prepared by any method known in the art. See, for example, U.S. Pat. Nos. 4,421,902; 4,384,096; 4,514,552; 4,600,761; 4,616,074; 5,294,692; 5,292,843; 5,770,760; and 5,412,142; the relevant disclosures of which are incorporated herein by reference.

Examples of vinyl associative (VA) monomers useful for use in connection with the present invention include, in one embodiment, those represented by Formula (V):

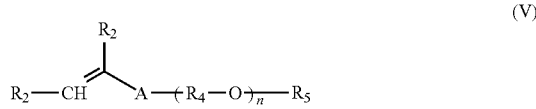

(V)

wherein, each $R_2$ is independently H, methyl, —C(O)OH, or —C(O)OR$_3$; $R_3$ is $C_1$ to $C_{30}$ alkyl; A is —CH$_2$C(O)O—, —C(O)O—, —O—, or —CH$_2$O—; (R$_4$—O)$_n$ is a polyoxyalkylene, which is a homopolymer, a random copolymer, or a block copolymer of $C_2$ to $C_4$ oxyalkylene units, wherein each $R_4$ is independently $C_2H_4$, $C_3H_8$, $C_4H_8$, or a mixture thereof, and n is an integer in the range of about 5 to about 250, or from about 5 to about 100, or from about 10 to about 80, or even from about 15 to about 60; and $R_5$ is a substituted or unsubstituted alkyl selected linear or branched $C_8$ to $C_{40}$ alkyls, $C_8$ to $C_{40}$ carbocyclic alkyls, $C_2$ to $C_{40}$ alkyl-substituted phenyls, aryl-substituted $C_2$ to $C_{40}$ alkyls, and $C_8$ to $C_{80}$ complex esters, wherein the $R_5$ alkyl group optionally comprises one or more substituents selected a hydroxyl group, an alkoxyl group, and/or a halogen group.

In one embodiment, suitable vinyl associative (VA) monomers of Formula (V) include, but are not limited to, cetyl polyethoxylated methacrylate (CEM), cetearyl polyethoxylated methacrylate (CSEM), stearyl polyethoxylated (meth)acrylate, arachidyl polyethoxylated (meth)acrylate, behenyl polyethoxylated methacrylate (BEM), lauryl polyethoxylated methacrylate (LEM), cerotyl polyethoxylated (meth)acrylate, montanyl polyethoxylated (meth)acrylate, melissyl polyethoxylated (meth)acrylate, lacceryl polyethoxylated (meth)acrylate, tristyryl phenolpolyethoxylated methacrylate (TEM), hydrogenated castor oil polyethoxylated methacrylate (HCOEM), canola polyethoxylated (meth)acrylate, and cholesterol polyethoxylated methacrylate (CHEM), where the polyethoxylated portion of the monomer comprises about 5 to about 100, or from about 10 to about 80, or even from about 15 to about 60 ethylene oxide repeating units.

In one embodiment, the VA monomer component in the monomer mixture comprises about 0.001 weight percent to about 25 weight percent of the monomer mixture, or from about 0.01 weight percent to about 20 weight percent, or from about 0.1 weight percent to about 15 weight percent, or even from about 1 weight percent to about 10 weight percent, on a total monomer mixture weight basis. Here, as well as elsewhere in the specification and claims, individual numerical values (including carbon atom numerical values), or limits, can be combined to form additional non-disclosed and/or non-stated ranges.

VS Monomer:

It has been found, surprisingly, that a vinyl surfactant (VS) monomer, which contains a polyoxyalkylene chain, can moderate the associative properties of multi-purpose polymers containing them, thus producing aqueous gels with highly desirable texture and rheological properties. While not wishing to be bound to any one theory, it is thought that the polyoxyalkylene group of the VS monomer interrupts or shields against non-specific associations between the hydrophobic groups of the associative monomers in the polymer and thus attenuates the associative properties of the polymers. Such VS monomers can tailor the thickening efficiency of the resulting polymers to customize the rheological properties of the polymer as desired for a selected application. Most surprisingly, the VS monomers are found to impart desirable rheological and aesthetic properties to aqueous gels, providing softer, smoother and more spreadable gels than multi-purpose polymers containing no VS monomer.

Surprisingly, incorporation of a VS monomer into a multi-purpose polymer can minimize or diminish viscosity reduction under low shear stress and can provide a shear thinning profile that is smooth flowing.

The polyoxyalkylene portion $(R_8—O)_v$ specifically comprises a long-chain polyoxyalkylene segment, which is substantially similar to the hydrophilic portion of the associative monomers. In one embodiment, polyoxyalkylene portion $(R_8—O)_v$ includes polyoxyethylene, polyoxypropylene, polyoxybutylene units, and combinations thereof comprising about 1 to about 250, or even about 5 to about 100 oxyalkylene units. When the VS monomer comprises more than one type of oxyalkylene unit, the units can be arranged in random, non-random, or block sequences.

Suitable VS monomers include, but are not limited to, those represented by Formula (VI):

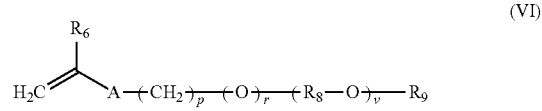

(VI)

where each $R_6$ is independently hydrogen or methyl, —C(O)OH, or —C(O)OR$_7$; $R_7$ is $C_1$ to $C_{30}$ alkyl; A is —CH$_2$C(O)O—, —C(O)O—, —O—, or —CH$_2$O—; p is an integer in the range of 0 to about 30, and r is 0 or 1, with the proviso that when p is 0, r is 0, and when p is in the range of 1 to about 30, r is 1; where $(R_8—O)_v$ is a polyoxyalkylene moiety, which can be arranged as a homopolymer, a random copolymer or a block copolymer of $C_2$ to $C_4$ oxyalkylene units, wherein each $R_8$ is independently $C_2H_4$, $C_3H_6$, $C_4H_8$, or a mixture thereof, and v is an integer in the range of about 1 to about 250, or from about 4 to about 100, or from about 10 to about 80, or even from about 15 to about 60; and $R_9$ is hydrogen or $C_1$ to $C_4$ alkyl.

In one embodiment, suitable VS monomers include, but are not limited to, monomers having the following chemical Formulas:

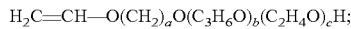

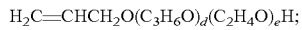

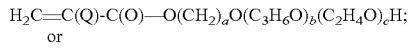
or

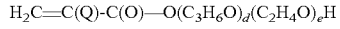

wherein Q is hydrogen or methyl; a is 2, 3, or 4; b is an integer in the range of 1 to about 20, or from about 2 to about 10, or even about 3 to about 7; c is an integer in the range of about 5 to about 50, or from about 8 to about 40, or even from about 10 to about 30; d is an integer in the range of 1 to about 20, or from about 2 to about 10, or even from about 3 to about 7; and e is an integer in the range of about 1 to about 50, or even from about 5 to about 40, or even from about 10 to about 25. In another embodiment, b or c can be zero. In still another embodiment, d or e can be zero.

Examples of suitable VS monomers include, but not limited to, polymerizable emulsifiers commercially available under the trade names EMULSOGEN® R109, R208, R307, RAL 100, RAL109, RAL208, and RAL307 sold by Clariant Corporation; BX-AA-E5P5 sold by Bimax, Inc.; and combinations thereof. In another embodiment, suitable VS monomers include, but are not limited to, EMULSOGEN® R208, R307, and RAL307.

According to the manufacturers: EMULSOGEN® R109 is a randomly ethoxylated/propoxylated 1,4-butanediol vinyl ether having the empirical formula $CH_2=CH—O(CH_2)_4O(C_3H_6O)_4(C_2H_4O)_{10}H$; EMULSOGEN® R208 is a randomly ethoxylated/propoxylated 1,4-butanediol vinyl ether having the empirical formula: $CH_2=CH—O(CH_2)_4O(C_3H_6O)_4(C_2H_4O)_{20}H$; EMULSOGEN® R307 is a randomly ethoxylated/propoxylated 1,4-butanediol vinyl ether having the empirical formula: $CH_2=CH—O(CH_2)_4O(C_3H_6O)_4(C_2H_4O)_{30}H$; EMULSOGEN® RAL109 is a randomly ethoxylated/propoxylated allyl ether having the empirical formula $CH_2=CHCH_2O(C_3H_6O)_4(C_2H_4O)_{10}H$; EMULSOGEN® RAL208 is a randomly ethoxylated/propoxylated allyl ether having the empirical formula $CH_2=CHCH_2O(C_3H_6O)_4(C_2H_4O)_{20}H$; EMULSOGEN® RAL307 is a randomly ethoxylated/propoxylated allyl ether having the empirical formula $CH_2=CHCH_2O(C_3H_6O)_4(C_2H_4O)_{30}H$; and BX-AA-E5P5 is a randomly ethoxylated/propoxylated allyl ether having the empirical formula $CH_2=CHCH_2O(C_3H_6O)_5(C_2H_4O)_5H$.

In one embodiment, suitable VS monomers that can be utilized in conjunction with the present invention include, but are not limited to, polyalkylene glycol monoallyl ethers (e.g., $CH_2=CHCH_2(OCH_2CH_2)_nOH$ such as polyglycol A350 ($M_w=350$); polyglycol A500 ($M_w=500$); and/or polyglycol A1100 ($M_w=1100$); and/or $CH_2=CHCH_2(OCH_2CH_2)_n(OCH_2CHCH_3)_mOH$ such as polyglycol A31/1000—3:1 ratio of EO:PO ($M_w=1000$); polyglycol A321550—3:2 ratio of EO:PO ($M_w=550$); polyglycol A11/1800—1:1 ratio of EO:PO ($M_w=1800$); polyglycol A91/550—3:2 ratio of EO:PO ($M_w=550$); polyglycol A 11-4—3:1 ratio of EO:PO ($M_w=750$); and/or polyglycol A 20-20—1:1 ratio of EO:PO ($M_w=2100$), polyalkylene glycol monovinyl ethers (e.g., $CH_2=CH(OCH_2CH_2)_nOH$ such as polyglycol R-500 ($M_w=500$); polyglycol R-1100 ($M_w=1100$); and/or polyglycol R-5000 ($M_w$=approximately 6000), polyethyleneglycol monomethylether monomethacrylate (i.e., $CH_3(OCH_2CH_2)_nOCOC(CH_3)=CH_2$ such as Genagen M 750 MA ($M_w=810$ to 870) and/or Genagen M 1100 MA ($M_w=1160$ to 1220), or suitable mixtures of any two or more thereof.

The amount of VS monomers utilized in the preparation of the multi-purpose polymers of the present invention can vary widely and depends, among other things, on the final rheological properties desired in the polymer. When utilized, the monomer reaction mixture contains, in one embodiment, at least about 0.01 weight percent of one or more VS monomers based on the total monomer mixture weight, or from even at least about 0.1 weight percent of one or more VS monomers based on the total monomer mixture weight. The monomer mixture comprises, in one embodiment, not more than about 25 weight percent of VS monomer, not more than about 20 weight percent of VS monomer, not more than about 15 weight percent of VS monomer, not more than about 10 weight percent of VS monomer, or even not more than about 7.5 weight percent of VS monomer, based on the total monomer mixture weight. In another embodiment, the monomer mixture comprises from about 0.01 weight percent to about 25 weight percent, or from about 0.1 weight percent to about 20 weight percent, or from about 0.5 weight percent to about 15 weight percent, or from about 1 weight percent to about 10 weight percent, or even from about 2 weight percent to about 7.5 weight percent of VS monomer, based on the total monomer mixture weight. Here, as well as elsewhere in the specification and claims, individual numerical values (including carbon atom numerical values), or limits, can be combined to form additional non-disclosed and/or non-stated ranges.

Polymerizable Silicone Macromer (PSM):

The inventive multi-purpose polymers can be prepared from monomer mixtures containing one or more polymerizable silicone macromers having one or more side, or lateral, chains that contain one or more repeating polyoxyalkylene units. The siloxane monomers useful in conjunction with the present invention can be represented by the following Formula:

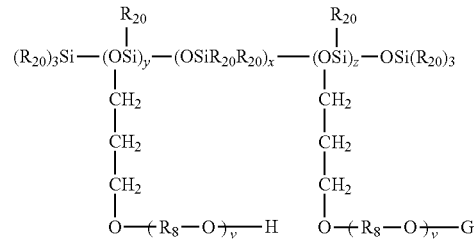

where each $R_{20}$ is independently selected from linear or branched $C_1$ to $C_{30}$ alkyl, $C_4$ to $C_{20}$ aryl, or $C_2$ to $C_{20}$ alkenenyl; where $(R_8—O)_v$ is a polyoxyalkylene moiety, which can be arranged as a homopolymer, a random copolymer or a block copolymer of $C_2$ to $C_4$ oxyalkylene units, wherein each $R_8$ is independently $C_2H_4$, $C_3H_6$, $C_4H_8$, or a mixture thereof, and v is an integer in the range of about 1 to about 250, or from about 4 to about 100, or from about 10 to about 80, or even from about 15 to about 60; x is an integer in the range of 0 to about 200; y is an integer in the range of 0 to about 200; and z is an Integer in the range of 1 to about 200; and where G is selected from any moiety that contains at least one free radically polymerizable carbon-carbon double bond.

G is selected from any moiety containing a free radically polymerizable carbon-carbon double bond. In one embodiment, G is a residue obtained from the esterification or etherification reaction of a silicone copolyol with a carbon-carbon double bond containing reactant. Upon esterification or etherification the carbon-carbon double bond remains intact and is available for free radical polymerization when the silicone macromer is polymerized into the backbone of the multi-purpose polymers of the invention. In another embodiment, the carbon-carbon double bond containing reactant is selected from cyclic anhydrides, (e.g., itaconic anhydride, citraconic anhydride, maleic anhydride and isomers thereof), (meth)acrylic acid, vinyl alcohol, and allyl alcohol. In still another embodiment, G can be a residue represented by the following Formulae:

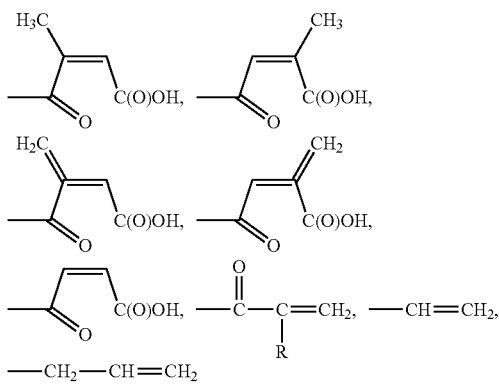

wherein this specific instance R represents hydrogen and methyl and the open bond line represents a covalent bond with an oxygen atom on the silicone copolyol.

The esterification reaction occurs between a terminal hydroxyl group on the silicone copolyol and the anhydride or carboxylic acid group provided by the cyclic anhydride and (meth)acrylic acid reactants, respectively. Likewise, the etherification reaction occurs between a terminal hydroxyl group on the silicone copolyol and the hydroxyl group situated on the vinyl or allyl alcohol. Esterification and etherification reactions are well known in the art. The reaction of silicone copolyols and cyclic anhydrides to form free radically polymerizable silicone macromers are disclosed in PCT Publication No. WO 2007/101048, which is herein incorporated by reference.

In the esterification reaction between the silicone copolyol and cyclic anhydrides disclosed above, the half ester or monoester of the polymerizable silicone macromer is depicted. In this embodiment a residual carboxyl functional group remains on the moiety contributed by the cyclic anhydride residue following the esterification reaction. It is also within the scope of this invention that silicone diester macromers can be formed by adjusting the stoichiometry of the reactants to allow the residual carboxyl group, to react with a terminal hydroxyl group provided by a second silicone copolyol to give a silicone macromer diester.

In another embodiment, each $R_{20}$ is independently selected from linear or branched $C_2$ to $C_{20}$ alkyl, $C_5$ to $C_{14}$ aryl, or $C_3$ to $C_{15}$ alkeneyl; where a is an integer in the range of 1 to about 50; b is an integer in the range of about 1 to about 50; x is an integer in the range of 1 to about 100; y is an integer in the range of 1 to about 100; and z is an integer in the range of 2 to about 100; and where G is as defined above. In still another embodiment, each $R_{20}$ is independently selected from linear or branched $C_3$ to $C_{10}$ alkyl, $C_6$ to $C_{10}$ aryl, or $C_4$ to $C_{10}$ alkeneyl; where a is an integer in the range of 5 to about 25; b is an integer in the range of about 5 to about 25; x is an integer in the range of 5 to about 50; y is an integer in the range of 5 to about 50; and z is an integer in the range of 5 to about 50; and where G is as defined above. Here, as well as elsewhere in the specification and claims, individual numerical values (including carbon atom numerical values), or limits, can be combined to form additional non-disclosed and/or non-stated ranges.

In one embodiment, the PSM monomer comprises about 0.01 weight percent to about 10 weight percent, or from about 0.1 weight percent to about 7.5 weight percent, or from about 0.5 weight percent to about 5 weight percent, or even from about 1 weight percent to about 2.5 weight percent, based on a total monomer mixture weight basis. Here, as well as elsewhere in the specification and claims, individual numerical values (including carbon atom numerical values), or limits, can be combined to form additional non-disclosed and/or non-stated ranges.

XL Monomer:

The inventive multi-purpose polymers can be prepared from a monomer mixture comprising one or more crosslinking monomers for introducing branching and controlling molecular weight. Suitable polyunsaturated crosslinkers are well known in the art. Mono-unsaturated compounds carrying a reactive group that is capable of causing a formed copolymer to be crosslinked before, during, or after polymerization has taken place can also be utilized. Other useful crosslinking monomers include polyfunctional monomers containing multiple reactive groups such as epoxide groups, isocyanate groups, and hydrolyzable silane groups. Various polyunsaturated compounds can be utilized to generate either a partially or substantially cross-linked three dimensional network.

Examples of suitable polyunsaturated crosslinking monomer components include, but are not limited to, polyunsaturated aromatic monomers such as divinylbenzene, divinyl naphthylene, and trivinylbenzene; polyunsaturated alicyclic monomers, such as 1,2,4-trivinylcyclohexane; di-functional esters of phthalic acid such as diallyl phthalate; polyunsaturated aliphatic monomers, such as dienes, trienes, and tetraenes, including isoprene, butadiene, 1,5-hexadiene, 1,5,9-decatriene, 1,9-decadiene, 1,5-heptadiene; and the like.

Other suitable polyunsaturated crosslinking monomers include, but are not limited to, polyalkenyl ethers such as triallyl pentaerythritol, diallyl pentaerythritol, diallyl sucrose, octaallyl sucrose, and trimethylolpropane diallyl ether; polyunsaturated esters of polyalcohols or polyacids such as 1,6-hexanediol di(meth)acrylate, tetramethylene tri(meth)acrylate, allyl(meth)acrylate, diallyl itaconate, diallyl fumarate, diallyl maleate, trimethylolpropane tri(meth)acrylate, trimethylolpropane di(meth)acrylate, and polyethylene glycol di(meth)acrylate; alkylene bisacrylamides, such as methylene bisacrylamide, propylene bisacrylamide, and the like; hydroxy and carboxy derivatives of methylene bisacrylamide, such as N,N'-bismethylol methylene bisacrylamide; polyethyleneglycol di(meth)acrylates, such as ethyleneglycol di(meth)acrylate, diethyleneglycol di(meth)acrylate, and triethyleneglycol di(meth)acrylate; polyunsaturated silanes, such as dimethyldivinylsilane, methyltrivinylsilane, allyldimethylvinylsilane, diallyldimethylsilane, and tetravinylsilane; polyunsaturated stannanes, such as tetraallyl tin, and diallyldimethyl tin; and the like.

Useful monounsaturated compounds carrying a reactive group include N-methylolacrylamide; N-alkoxy(meth)acrylamide, wherein the alkoxy group is a $C_1$ to $C_{18}$ alkoxy; and unsaturated hydrolyzable silanes such as triethoxyvinylsilane, tris-isopropoxyvinylsilane, and 3-triethoxysilylpropyl methacrylate; and the like.

Useful polyfunctional crosslinking monomers containing multiple reactive groups include, but are not limited to, hydrolyzable silanes such as ethyltriethoxysilane and ethyltrimethoxysilane; epoxy-substituted hydrolyzable silanes, such as 2-(3,4-epoxycyclohexyl)ethyltriethoxysilane and 3-glycidoxypropyltrimethoxysilane; polyisocyanates, such as 1,4-diisocyanatobutane, 1,6-diisocyanatohexane, 1,4-phenylenediisocyanate, and 4,4'-oxybis(phenylisocyanate); unsaturated epoxides, such as glycidyl methacrylate and alkylglycidyl ether; polyepoxides, such as diglycidyl ether, 1,2,5,6-diepoxyhexane, and ethyleneglycoldiglycidyl ether; and the like.

Also useful are polyunsaturated crosslinkers derived from ethoxylated polyols, such as diols, triols and bis-phenols, ethoxylated with about 2 to about 100 moles of ethylene oxide per mole of hydroxyl functional group and end-capped with a polymerizable unsaturated group such as a vinyl ether, allyl ether, acrylate ester, methacrylate ester, and the like. Examples of such crosslinkers include bisphenol A ethoxylated dimethacrylate; bisphenol F ethoxylated dimethacrylate, ethoxylated trimethylol propane trimethacrylate, and the like. Other ethoxylated crosslinkers useful in the multi-purpose polymers of the present invention include ethoxylated polyol-derived crosslinkers disclosed in U.S. Pat. No. 6,140,435, the relevant disclosure of which is incorporated herein by reference.

Examples of particularly suitable XL monomers include, but are not limited to, acrylate and methacrylate esters of polyols having at least two acrylate or methacrylate ester groups, such as trimethylolpropane triacrylate (TMPTA), ethoxylated-3 trimethylolpropane triacrylate (TMPEO3TA), ethoxylated-15 trimethylolpropane triacrylate (TMPEO15TA), trimethylolpropane dimethacrylate, triethylene glycol dimethacrylate (TEGDMA), ethoxylated (30) bisphenol A dimethacrylate (EOBDMA); polyalkenyl ethers (APE) such as triallyl pentaerythritol, diallyl pentaerythritol, and trimethylolpropane diallyl ether (TMPDAE); sucrose allyl ethers (AS) such as diallyl sucrose, octaallyl sucrose; alkylene bisacrylamides, such as methylene bisacrylamide (MBA), propylene bisacrylamide; and suitable mixtures of any two or more thereof.

When utilized, crosslinking monomers are present in the monomer reaction mixture in an amount of up to about 5 weight percent, based on total monomer mixture weight. In another embodiment, the XL monomers are present in an amount in the range of about 0.001 weight percent to about 5 weight percent, or from about 0.01 weight percent to about 4 weight percent, or from about 0.05 weight percent to about 3 weight percent, or from about 0.1 weight percent to about 2 weight percent, or even from about 0.5 weight percent to about 1 weight percent of the monomer mixture based on the total monomer mixture weight. Here, as well as elsewhere in the specification and claims, individual numerical values (including carbon atom numerical values), or limits, can be combined to form additional non-disclosed and/or non-stated ranges.

Chain Transfer Agent:

The inventive multi-purpose polymers can optionally be prepared from a monomer mixture comprising one or more chain transfer agents (CTA), which are well known in the polymer arts.

Suitable chain transfer agents for use in this invention, without being limited thereto, are selected from a variety of thio- and disulfide-containing compounds, such as $C_1$ to $C_{18}$ alkyl mercaptans, mercaptocarboxylic acids, mercaptocarboxylic esters, thioesters, $C_1$ to $C_{18}$ alkyl disulfides, aryldisulfides, polyfunctional thiols, and the like; phosphites and hypophosphites; haloalkyl compounds, such as carbon tetrachloride, bromotrichloromethane, and the like; and unsaturated chain transfer agents, such as alpha-methylstyrene.

Polyfunctional thiols include trifunctional thiols, such as trimethylolpropane-tris-(3-mercaptopropionate), tetrafunctional thiols, such as pentaerythritol-tetra-(3-mercaptopropionate), pentaerythritol-tetra-(thioglycolate), and pentaerythritol-tetra-(thiolactate); hexafunctional thiols, such as dipentaerythritol-hexa-(thioglycolate); and the like.

Alternatively, the chain transfer agent can be any catalytic chain transfer agent which reduces molecular weight of addition polymers during free radical polymerization of vinyl monomers. Examples of catalytic chain transfer agents include, for example, cobalt complexes (e.g., cobalt (II) chelates). Catalytic chain transfer agents can often be utilized in relatively low concentrations relative to thiol-based CTAs.

Examples of suitable chain transfer agents include, but not limited to, octyl mercaptan, n-dodecyl mercaptan, t-dodecyl mercaptan, hexadecyl mercaptan, octadecyl mercaptan (ODM), isooctyl 3-mercaptopropionate (IMP), butyl 3-mercaptopropionate, 3-mercaptopropionic acid, butyl thioglycolate, isooctyl thioglycolate, dodecyl thioglycolate, and the like. The chain transfer agents can be added to a monomer reaction mixture in amounts of up to about 10 weight percent of polymerizable monomer mixture, based on total monomer mixture weight. When present, the chain transfer agent comprises at least about 0.05 weight percent of the mixture, based on the total monomer weight. Here, as well as elsewhere in the specification and claims, individual numerical values (including carbon atom numerical values), or limits, can be combined to form additional non-disclosed and/or non-stated ranges.

Multi-Purpose Polymers and Methods for Producing Same:

The inventive multi-purpose polymers can be synthesized by conventional polymerization techniques, such as, for example, by emulsion polymerization, inverse emulsion polymerization, solution polymerization, precipitation polymerization, mass polymerization, and dispersion polymerization. Such polymerization techniques are well known in the polymer art.

In one embodiment of the invention, the multi-purpose polymer is polymerized from its constituent monomers by emulsion polymerization which can be performed as a simple batch process, as a metered addition process, or the reaction can be initiated as a small batch and then the bulk of the monomers can be continuously metered into the reactor (seed process). Typically the polymerization process is carried out at a reaction temperature in the range of about 20° C. to about 95° C., however, higher or lower temperatures can be used. To facilitate emulsification of the monomer mixture, the emulsion polymerization is carried out in the presence of at least one surfactant. In one embodiment, the emulsion polymerization is carried out in the presence of surfactant in the amount of about 1 weight percent to about 10 weight percent, or in the range of about 3 weight percent to about 8 weight percent, or even in the range of about 5 weight percent to about 7 weight percent, on a total emulsion weight basis. Here, as well as elsewhere in the specification and claims, individual numerical values (including carbon atom numerical values), or limits, can be combined to form additional non-disclosed and/or non-stated ranges.

The emulsion polymerization reaction mixture also includes one or more free radical initiators. In one embodiment the one or more free radical initiators are present in an amount in the range of about 0.01 weight percent to about 3 weight percent based on total monomer weight. The polymerization can be performed in an aqueous or aqueous alcohol medium at neutral to moderately alkaline pH.

In a typical polymerization, a mixture of monomers is added with mixing agitation to a solution of emulsifying surfactant, such as a nonionic surfactant, in one embodiment this is a linear or branched alcohol ethoxylate, or mixtures of nonionic surfactants and anionic surfactants, such as fatty alcohol sulfates or alkyl sulfonates, in a suitable amount of water, in a suitable reactor, to prepare a monomer emulsion. The emulsion is deoxygenated by any convenient method, such as by sparging with nitrogen, and then a polymerization reaction is initiated by adding a polymerization catalyst (initiator) such as sodium persulfate, or any other suitable addition polymerization catalyst, as is well known in the emulsion polymerization art. The reaction is agitated until the polymerization is complete, typically for a time in the range of about 4 to about 16 hours. The monomer emulsion can be heated to a temperature in the range of about 20° C. to about 95° C. prior to addition of the initiator, if desired. Unreacted monomer can be eliminated by addition of more catalyst, as is well known in the emulsion polymerization art. The resulting polymer emulsion product can then be discharged from the reactor and packaged for storage or use. Optionally, the pH or other physical and chemical characteristics of the emulsion can be adjusted prior to discharge from the reactor. Typically, the product emulsion has a total solids (TS) content in the range of about 10 weight percent to about 60 weight percent. Typically, the total polymer content of the product emulsion is in the range of about 15 weight percent to about 50 weight percent, generally not more than about 40 weight percent. Here, as well as elsewhere in the specification and claims, individual numerical values (including carbon atom numerical values), or limits, can be combined to form additional non-disclosed and/or non-stated ranges.

Suitable surfactants for facilitating emulsion polymerizations include nonionic, anionic, amphoteric, cationic surfactants, and mixtures thereof. Most commonly, nonionic and anionic surfactants are utilized or mixtures thereof. The physical properties of the neutralized polymer (e.g., viscosity, spreadability, clarity, texture, and the like) can be varied by appropriate selection of the hydrophobic and hydrophilic properties of the emulsifying surfactant, as is well known in the art.

Nonionic surfactants suitable for facilitating emulsion polymerizations are well known in the polymer art, and include, without limitation, linear or branched alcohol ethoxylates, $C_8$ to $C_{12}$ alkylphenol alkoxylates, such as octylphenol ethoxylates, polyoxyethylene polyoxypropylene block copolymers, and the like. Other useful nonionic surfactants include $C_8$ to $C_{22}$ fatty acid esters of polyoxyethylene glycol, mono and diglycerides, sorbitan esters and ethoxylated sorbitan esters, $C_8$ to $C_{22}$ fatty acid glycol esters, block copolymers of ethylene oxide and propylene oxide having an HLB value of greater than about 12, ethoxylated octylphenols, and combinations thereof.

Suitable alkylphenol alkoxylate surfactants include, but are not limited to, an octylphenol sold under the trade name IGEPAL® CA-897 by Rhodia, Inc. In another embodiment, linear alcohol alkoxylates include polyethylene glycol ethers of cetearyl alcohol (a mixture of cetyl and stearyl alcohols) sold under the trade names PLURAFAC® C-17, PLURAFAC® A-38 and PLURAFAC® A-39 by BASF Corp. In still another embodiment, polyoxyethylene polyoxypropylene block copolymers include copolymers sold under the trade names PLURONIC® F127, and PLURONIC® L35 by BASF Corp.

Other suitable nonionic surfactants include, but are not limited to, Ethoxylated linear fatty alcohols such as DISPONIL® A 5060 (Cognis), Ethal LA-23 and Ethal LA-50 (Ethox Chemicals), branched alkyl ethoxylates such as GENAPOL® X 1005 (Clariant Corp.), secondary $C_{12}$ to $C_{14}$ alcohol ethoxylates such as TERGITOL® S15-30 and S15-40 (Dow Chemical Co.), ethoxylated octylphenol-based surfactants such as TRITON® X-305, X-405 and X-705 (Dow Chemical Co.), IGEPAL® CA 407, 887, and 897 (Rhodia, Inc.), ICONOL® OP 3070 and 4070 (BASF Corp), SYNPERONIC® OP 30 and 40 (Uniqema), block copolymers of ethylene oxide and propylene oxide such as PLURONIC® L35 and F127 (BASF Corp.), and secondary $C_{11}$, alcohol ethoxylates such as EMULSOGEN® EPN 407 (Clariant Corp.). Numerous other suppliers are found in the trade literature.

Anionic surfactants suitable for facilitating emulsion polymerizations are well known in the polymer art, and include sodium lauryl sulfate, sodium dodecyl benzene sulfonate, sodium dioctyl sulfosuccinate, sodium di-sec-butyl naphthylene sulfonate, disodium dodecyl-diphenyl ether sulfonate, and disodium n-octadecyl sulfosuccinate, and the like.

Suitable polymeric stabilizers (also known as protective colloids) for the emulsion polymerization process of this invention are water-soluble polymers, including, for example, synthetic polymers, such as polyvinyl alcohol, partially hydrolyzed polyvinyl acetate, polyvinylpyrrolidone, polyacrylamide, polymethacrylamide, carboxylate-functional addition polymers, polyalkyl vinyl ethers and the like; water-soluble natural polymers, such as gelatin, pectins, alginates, casein, starch, and the like; and modified natural polymers, such as methylcellulose, hydroxypropylcellulose, carboxymethylcellulose, allyl modified hydroxyethylcellulose, and the like. In some cases, it can be of advantage to use mixtures of a synthetic and a natural protective colloid, for example, a mixture of polyvinyl alcohol and casein. Further suitable natural polymers are mixed ethers such as methylhydroxyethylcellulose and carboxymethylmethylcellulose. Polymeric stabilizers can be utilized in amounts up to about 10 weight percent based on the total emulsion weight, or up to about 7.5 weight percent, or up to about 5 weight percent, or up to about 2.5 weight percent, or up to about 2 weight percent based on the total emulsion weight. In another embodiment, when utilized, a polymeric stabilizer is included in an amount in the range of about 0.001 weight percent to about 10 weight percent, or from about 0.01 weight percent to about 7.5 weight percent, or from about 0.1 weight percent to about 5 weight percent, or from about 0.5 weight percent to about 2.5 weight percent, or even from about 1 weight percent to about 2 weight percent, based on the total emulsion weight. Here, as well as elsewhere in the specification and claims, individual numerical values (including carbon atom numerical values), or limits, can be combined to form additional non-disclosed and/or non-stated ranges.

The polymeric stabilizers which are used according to this invention are termed water-soluble when they are miscible in water in any proportion or have a solubility in 20° C. water of at least about 0.1 weight percent and do not precipitate from these aqueous solutions on dilution with water at the foregoing temperature. The molecular weight of the water-soluble synthetic polymeric stabilizers is typically in the range of about 5,000 to about 2,000,000, or from about 25,000 to about 1,500,000 Daltons. The viscosity of aqueous solutions of the polymeric stabilizers is typically in the range of about 1 to about 10,000 mPa·s at a concentration of about 2 percent to about 10 weight percent and a temperature of about 20° C. Here, as well as elsewhere in the specification and claims, individual numerical values (including carbon atom numerical values), or limits, can be combined to form additional non-disclosed and/or non-stated ranges.

A useful polymeric stabilizer is an allyl modified hydroxyethylcellulose, such as TYLOSE® AM-HEC grades available from Clariant. The reactive allyl groups in the side chain increase the grafting power of the cellulose ether resulting in a stable emulsion. A TYLOSE® stabilizer is allyl modified hydroxyethylcellulose powder (particle size less than 180 μm) TYLOSE® AM H40 YP2 (AMHEC).

Exemplary free radical initiators include, but are not limited to, the water-soluble inorganic persulfate compounds, such as ammonium persulfate, potassium persulfate, and sodium persulfate; peroxides such as hydrogen peroxide, benzoyl peroxide, acetyl peroxide, and lauryl peroxide; organic hydroperoxides, such as cumene hydroperoxide and t-butyl hydroperoxide; organic peracids, such as peracetic acid; and oil soluble, free radical producing agents, such as 2,2'-azobisisobutyronitrile, and the like, and suitable mixtures of two or more thereof. Peroxides and peracids can optionally be activated with reducing agents, such as sodium bisulfite or ascorbic acid, sulfinic acid derivatives, e.g., Bruggolite® FF6 and FF7 (Bruggemann Chemical) transition metals, hydrazine, and the like. In one embodiment, suitable free-radical polymerization initiators include, but are not limited to, water soluble azo polymerization initiators, such as 2,2'-azobis(tert-alkyl) compounds having a water solubilizing substituent on the alkyl group. In another embodiment, azo polymerization catalysts include, but are not limited to, the VAZO® free-radical polymerization initiators, available from DuPont, such as VAZO® 44 (2,2'-azobis(2-(4,5-dihydroimidazolyl)propane), VAZO® 56 (2,2'-azobis(2-methylpropionamidine)dihydrochloride), and VAZO® 68 (4,4'-azobis(4-cyanovaleric acid)).

Optionally, other emulsion polymerization additives, which are well known in the emulsion polymerization art, such as solvents, buffering agents, chelating agents, inorganic electrolytes, chain terminators, and pH adjusting agents can be included in the polymerization system.

One suitable general emulsion polymerization procedure for the preparation of multi-purpose polymers of the present invention is provided below.

In one embodiment, a monomer emulsion is prepared in a reactor equipped with a nitrogen inlet and an agitator by combining a desired amount of each monomer in a quantity of water containing an emulsifying amount of a nonionic surfactant, or a mixture of a nonionic surfactant and an anionic surfactant, under a nitrogen atmosphere, and with mixing agitation. The degree of agitation required to form an emulsion from a monomer mixture of the type described above is well known to those of skill in the art. The so-formed emulsion is substantially deoxygenated by any suitable method known in the art, such as by sparging with nitrogen, and then a free radical initiator is added to the emulsion, with continuous mixing agitation, to initiate polymerization. The temperature of the emulsion can be adjusted, before or after addition of the initiator, to a temperature in the range of about 20° C. to about 60° C., if desired. After the addition of initiator, the temperature of the polymerization reaction mixture is typically adjusted to a temperature in the range of about 60° C. to 95° C. and held at such temperature for a time sufficient to complete the polymerization, typically in the range of about 3 to about 14 hours. Optionally, unreacted residual monomers can be destroyed or further polymerized by the addition of various redox reagents or catalysts. The resulting polymer emulsion can then be cooled and discharged from the reactor and collected.

One skilled in the polymer art will recognize that the amounts of each monomer component can be adjusted to obtain polymers having any desired ratio of monomer components. Varying proportions of water can also be utilized, as desired. Water miscible solvents, such as alcohols, and other polymerization additives, as described above, may also be, included in the reaction mixture. Suitable alcohols include, but are not limited to, glycols such as ethylene glycol, propylene glycol, butylene glycol, hexylene glycol, glycerol, and the like.

The product polymer emulsions can be prepared to, in one embodiment, contain about 1 percent to about 60 percent total polymer solids, or from about 10 percent to about 40 percent total polymer solids, or even from about 15 percent to about 25 percent total polymer solids based on the weight of the polymer. Here, as well as elsewhere in the specification and claims, individual numerical values (including carbon atom numerical values), or limits, can be combined to form additional non-disclosed and/or non-stated ranges. Prior to any neutralization, the polymer emulsions, as produced, typically have a pH in the range of about 7 or greater, a Brookfield viscosity of not more than about 100 mPa·s at ambient room temperature (spindle #2, 20 rpm).

Optionally, the produced multi-purpose polymer emulsions can be further processed by adjusting the pH to a value in the range of about 1 to not more than about 7, if an acidic pH is desired, with acidic materials, such as organic acids, mineral acids, and the like. The multi-purpose polymer emulsions typically swell to form smooth, viscous solutions that are flowable and sprayable, or gels at neutral to acidic pH, and the polymers are generally substantially stable at such pH values. The multi-purpose polymer emulsions can be diluted with water or solvent, or concentrated by evaporating a portion of the water. Alternatively, the obtained multi-purpose polymer emulsion can be substantially dried to a powder or crystalline form by utilizing equipment well known in the art, such as, for example, a spray drier, a drum drier, a freeze drier, and the like.

The inventive multi-purpose polymers can be prepared by, for example, emulsion polymerization, solution polymerization, precipitation polymerization, bulk polymerization, dispersion polymerization and utilized by incorporating various known additives and conventional adjuvants, and solvents other than water, as needed. When emulsion polymerization selected as the polymerization technique, the polymerization reaction can be run via batch and semi-batch techniques.

A multi-purpose polymer of this invention, at a weight concentration of about 2 percent in deionized water, in its neutralized or acidic form at a pH in the range of about 1 to about 7, can provide a Brookfield viscosity ranging from about 300 mPa·s to about 100,000 mPa·s or more (Brookfield RVT, 20 rpm; at about 25° C. ambient room temperature).

The molecular weight (weight average) of the multi-purpose polymers of the invention range from about 5,000 daltons to about 10,000,000 daltons in one aspect, from about 10,000 daltons to about 5,000,00 daltons in another aspect, and from about 50,000 daltons to about 3,000,000 daltons in a further aspect of the invention, as measured by GPC using a polystyrene standard.

The multi-purpose polymers of the invention can be utilized in a variety of products for personal care, health care, home care, institutional and industrial (collectively "I&I") care, and in a variety of products for medical and industrial applications. The inventive multi-purpose polymers can be employed as emulsifiers, stabilizers, suspending agents, deposition aids for enhancing the efficacy, deposition or delivery of chemically and physiologically active ingredients and cosmetic materials, film formers, thickeners, rheology modifiers, hair fixatives, conditioning fixatives, conditioners, moisturizers, spreading aids, carriers, and as an agent for improving the psychosensory, and aesthetic properties of a formulation in which they are included. Additionally, the cationic character of the multi-purpose polymers of the invention makes these polymers useful as antistats, and, under certain conditions, may also provide biocidal, bacteriostatic, preservative, and anti-microbial activity.

Methods:

Viscosity: The reported viscosity of each polymer containing composition is measured in milli-Pascal seconds (mPa·s) (cP), employing a Brookfield rotating spindle viscometer (Brookfield Engineering Laboratories, Inc., Model RVT) at 20 revolutions per minute·(rpm), at ambient room temperature of about 20° C. to about 25° C. (referred to as Brookfield viscosity). Spindle sizes utilized for a particular viscosity measurement are selected according to viscosity tables supplied by the manufacturer.

A "thin or low viscosity" typically refers to a pourable, runny product having a viscosity of up to about 1,000 mPa·s a "medium viscosity" refers to a product having a viscosity in the range of above 1,000 to about 3,000 mPa·s; a "high viscosity" refers to a product having a viscosity in the range of above 3,000 to about 10,000 mPa·s; and "gel" refers to a product having a viscosity greater than 10,000 mPa·s, unless otherwise indicated.

Yield Value: Yield value is defined as the initial resistance to flow under stress. It is measured by the Brookfield Yield Value (BYV) Extrapolation Method using a Brookfield viscometer (Model RVT). The Brookfield viscometer is used to measure the torque necessary to rotate a spindle through a liquid sample at speeds of 0.5 to 100 rpm. Multiplying the torque reading by the appropriate constant for the spindle and speed gives the apparent viscosity. Yield Value is an extrapolation of measured values to a shear rate of zero. The BYV is calculated by the following equation:

$$BYV, dyn/cm^2 = (\eta_{a1} - \eta_{a2})/100$$

where $\eta_{a1}$ and $\eta_{a2}$=apparent viscosities obtained at two different spindle speeds (0.5 rpm and 1.0 rpm, respectively). These techniques and the usefulness of the Yield Value measurement are explained in Technical Data Sheet Number 244 (Revision: 5/98) from the Noveon Consumer Specialties Division of Lubrizol Advanced Materials, Inc., herein incorporated by reference. Low yield values (<50 dyns/cm$^2$) are indicative of smooth and Newtonian-like flow properties.

Clarity: When reported, the clarity of the polymer-containing composition is measured in % T (transmittance) by Brinkmann PC 920 colorimeter at least about 24 hours after the composition is made. Clarity measurements are taken against deionized water (clarity rating of 100 percent). Compositions having a clarity of about 60 percent or more are substantially clear; compositions having a clarity in the range of about 45 percent to 59 percent are judged substantially translucent.

D. Turbidity: When reported, the turbidity of a polymer-containing composition is determined in Nephelometric Turbidity Units (NTU) employing a Nephelometric turbidity meter with distilled water (NTU=0) as the standard. Compositions having an NTU value of about 90 or greater are judged turbid.

E. Stability: The stability of the polymer product emulsion or formulated composition is evaluated by one or more of the following procedures.

Shelf Storage: A sample of test product is stored at one or more of the following temperatures: (a) at ambient room temperature in the range of about 20° C. to about 25° C. for a period of at least one week and up to about six months; (b) at elevated temperature in an oven at a selected temperature in the range of about 30° C. to about 50° C. (unless otherwise indicated) for a period of up to about 5 weeks (accelerated aging storage).

Stability is determined by periodically visually observing the stored sample for visible sedimentation or a noticeable increase in measurable Brookfield viscosity determined at a selected interval as indicated in the following examples. At ambient temperature storage, the sample is visually checked daily for one week, then biweekly during a total storage period of about two months and monthly thereafter during a total storage period of up to about six months. Under either storage temperature, compositions are judged stable if: (a) no sedimentation is observed, or if some sedimentation occurs and it is not more than about 2 percent of the total volume of the sample; and (b) the product viscosity did not increase, or if an increase occurs, the increase is not more than about 100 mPa·s.

F. Amine Hydrolysis by Acid-Base Titration: An acid-base titration is performed for each monomer to follow its hydrolytic stability periodically for 1 or 2 weeks in an excess amount of water at 1:1 weight ratio (1:10 mole ratio). A 100 percent hydrolysis of amine monomer is expected to yield 1 mole of amine alcohol and 1 mole of methacrylic acid which can be measured by acid-base titration (acid number, mg KOH/g).

G. Suspension Testing Procedure: The ability of a polymer system to suspend active and/or aesthetically pleasing insoluble oily and particulate materials is important from the standpoint of product efficacy and appeal. Suspension ability is tested using the clear bath gel samples as formulated in Table 4. A six dram vial (approximately 70 mm high×25 mm in diameter) is filled to the 50 mm mark with a bath gel test formulation. Aesthetic beads (Unispheres UEA-509, available from Induchem AG, Switzerland, composition: lactose, cellulose, hydroxypropyl methylcellulose) are dispersed throughout the bath gel sample and photographed to establish the initial position of the beads in the gel. The vials are placed in a 45° C. oven to age for a 12 week period. At the conclusion of the 12 week oven test period the samples are checked for bead suspension properties. The suspension results are visually ranked using a scale of 4 to 0 where: 4=no noticeable settling relative to the initial bead position in the gel, 3=slight settling or less than approximately % drop in distance relative to the initial bead position in the gel, 2=approximately ¼ drop in distance relative to the initial position in the gel, 1=greater than ¼ drop to ½ drop in distance relative to the initial position in the bath gel, and 0=greater than ½ drop in distance relative to the initial position in the bath gel.

H. Molecular Weight Determination: The weight average molecular weights referenced herein are measured by GPC using a PL-GPC 220 high temperature GPC instrument with RI detector manufactured by Polymer Laboratories (Varian, Inc.). Approximately 0.02 g polymer sample is dissolved in 5 ml of tetrahydrofuran (THF), containing 250 ppm of butylated hydroxytoluene (BHT) and 0.05 molar $NaNO_3$. The test sample solution is gently shaken for about two hours and filtered by passing the sample solution through a 0.45 μm PTFE disposable disc filter. The chromatographic conditions are: Mobile phase: THF, with 250 ppm BHT and 1.0% acetic acid, 70° C., 1.0 ml/min. Sample size: 100 μl Column set: PLgel (Guard+2× Mixed-C), all 5 μm, in series. Waters Empower Pro LC/GPC software is used to analyze the results and to calculate $M_w$ of the polymers of the invention. A polystyrene standard is used.

EXAMPLES

The following examples further illustrate the preparation and use of embodiments but are not intended to be limiting. The following is a list of material abbreviations and Trade Names utilized in the specification.

Control 3 INCI Name: Polyacrylate-1 Crosspolymer
ACE ACE™ Hydroxyl acrylate monomer is the reaction product of acrylic acid with Cardura™. Cardura is the glycidyl ester of VERSATIC™ acid 10, a highly branched saturated carboxylic acid containing 10 carbon atoms
EA Ethyl acrylate
MA Methyl acrylate
MMA Methyl methacrylate
Mam Methacrylamide
n-BA n-Butyl acrylate
2-EHA 2-Ethylhexyl acrylate
DEIA Diethyl itaconate
TMCHMA 3,3,5-Trimethylcyclohexyl methacrylate
DMAEMA 2-(dimethylamino)ethyl methacrylate
DMAPMA 3-(dimethylamino)propyl methacrylate
DMAIPMA 1-(dimethylamino)propan-2-yl methacrylate
DMABMA 4-(dimethylamino)butyl methacrylate
DMADMEMA 2-(dimethylamino)-2-methylpropyl methacrylate
DMADMPMA 2-(dimethylamino)-2,2-dimethylpropyl methacrylate
DMANPA N,N-dimethylaminoneopentyl acrylate
CSEM25 Ceteareth-25 methacrylate
HEMA 2-Hydroxyethyl methacrylate
TEGDMA Triethyleneglycol dimethacrylate
TMPDAE Trimethylolpropane diallylether
TMPTA Trimethylolpropane triacrylate
MBA Methylenebisacrylamide
AS Allyl ether of sucrose
APE Allyl ether of pentaerythritol
VEOVA-10 Vinyl neodecanoate
VP N-Vinyl pyrrolidone
SMA Stearyl methacrylate
$H_2O_2$ Hydrogen peroxide
Polyglykol A randomly ethoxylated/propoxylated allyl ether having the empirical formula $CH_2=CHCH_2O(C_3H_6O)_4(C_2H_4O)_6$—H; (Polyglykol A32/550, Clariant Corporation)
RAL307 A randomly ethoxylated/propoxylated allyl ether having the empirical formula $CH_2=CHCH_2O(C_3H_6O)_4(C_2H_4O)_{30}$—H; (EMULSOGEN™ RAL307, Clariant Corporation)
E407 Secondary $C_{11}$ ethoxylate having 40 ethylene oxide units per alcohol unit (EMULSOGEN™ EPN 407, Clariant Corp.)
IPA Isopropyl alcohol
EtOH Ethanol
Si Macromer PEG/PPG-23/6 dimethicone citraconate macromonomer Synthesis of DMAPMA or DMADMPMA—Via Transesterification:

To a reaction flask equipped with a distillation column with a condenser, thermometer, and a nitrogen/air inlet is added 2.5 equivalents of methyl methacrylate (MMA), (1.0 equivalent)dimethylamino-propanol (DMAPOL) or 3-dimethylamino-2,2-dimethyl-1-propanol (DMADMPOL), a suitable amount of a polymerization inhibitor(s) such as phenothiazine or MEHQ, and catalytic amount of a suitable transesterification catalyst. Suitable catalysts include, but are not limited to, Sn salts, Ti salts, Zr salts, and Zn salts. In one embodiment, such catalysts include, but are not limited to, tin chloride, tin triflate, dimethyltin chloride, dibutyltin diacetate, dibutyltin dichloride, dibutyltin dilaurate, dibutyltin ditriflate, dibutyltin oxide, dibutyltin dimethoxide, dibutyltin diethoxide, dioctyltin diacetate, dioctyltin dichloride, dioctyltin dilaurate, dioctyltin ditriflate, dioctyltin oxide, dioctyltin dimethoxide, dioctyltin diethoxide; titanium chloride, titanium methoxide, titanium ethoxide, titanium isopropoxide, titanium butoxide etc. The mixture is heated to reflux with a very gentle flow of $N_2$/air. The temperature is maintained at 100° C. to 120° C. until the reaction is finished as indicated by GC analysis. Upon completion of the reaction, the desired monomer can be purified by vacuum distillation in good yield.

Regarding the dimethylamino-propanol (DMAPOL) or the 3-dimethylamino-2,2-dimethyl-1-propanol (DMADMPOL), these compounds can be synthesized in accordance with a number of techniques including, but not limited to, those techniques/methods disclosed in U.S. Provisional Patent Application No. 61/231,780, filed on Aug. 6, 2009, which is incorporated herein in its entirety for all that it discloses.

Acid-Base Titration: A series of amine acrylate monomers are synthesized in accordance with the exemplary method disclosed above and tested for hydrolytic stability. The hydrolytic stability of these amine monomers is tested and compared with the stability of DMAEMA (see FIG. 1). Higher acid number indicates a higher degree of amine hydrolysis. In contrast, all other amines with increased chain length and hydrophobicity show a higher degree of hydrolytic stability as compared to the DMAEMA. Increasing hydrophobicity through carbon chain length between the nitrogen and the ester oxygen atom is found to be an unexpected factor in reducing hydrolysis. Branching effectively enhances the hydrolytic stability of the increased chain length when the chain length between nitrogen and ester oxygen is extended with at least 3 carbon atoms or 2 carbon atoms with alkyl substitution.

Figure 2:
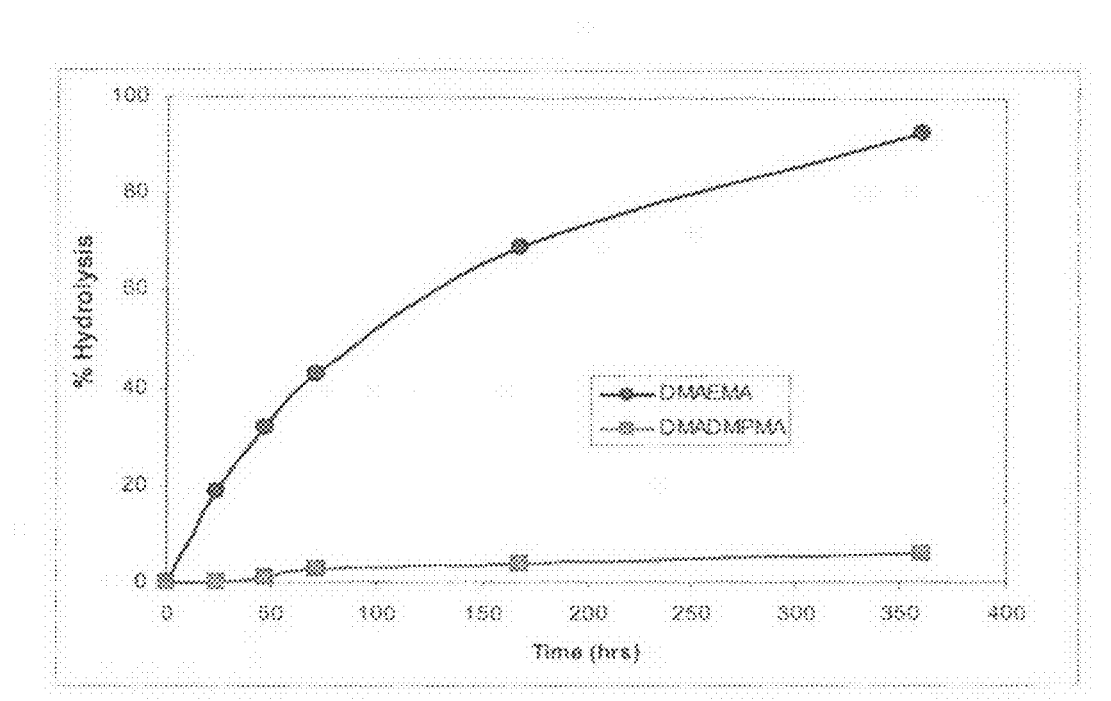
FIG. 2 is a plot of percent hydrolysis versus time for DMAEMA and DMADMPMA as determined by $^1$H NMR at 500 Hz.

$^1$H NMR Study: In order to confirm the performance of DMADMPMA, the hydrolysis process is monitored by $^1$H NMR analysis (see FIG. 2). Again, DMADMPMA shows excellent hydrolytic stability over DMAEMA.

Polymerization General Procedure: In a typical polymerization, a mixture of monomers is added to a solution of emulsifying surfactant that is undergoing mixing, such as a nonionic surfactant, such as a linear or branched alcohol ethoxylate, or mixtures of nonionic surfactants and anionic surfactants, such as fatty alcohol sulfates or alkyl sulfonates, methyl glucoside derivatives (Glucamate™ DOE 120, Glucamate™ SSE-20, and Glucamate™ LT) in a suitable amount of water that is contained in a 2 L reactor to prepare a monomer emulsion. The emulsion is deoxygenated by any suitable method, such as by sparging with nitrogen, and then a polymerization reaction is initiated by adding a polymerization catalyst (initiator) such as sodium persulfate or any other suitable addition polymerization catalyst, as is well known in the emulsion polymerization art. The reaction is agitated until the polymerization is complete, typically for a time in the range of about 4 hours to about 16 hours. The monomer emulsion can be heated to a temperature in the range of about 20° C. to about 95° C. prior to addition of the initiator, if desired. Unreacted monomer can be eliminated by addition of more catalyst, as is well known in the emulsion polymerization art. The resulting polymer emulsion product can then be discharged from the reactor and packaged for storage or use. Optionally, the pH or other physical and chemical characteristics of the emulsion can be adjusted prior to discharge from the reactor. Typically, the total polymer content of the product emulsion is in the range of about 15 weight percent to about 60 weight percent total polymer solids (TS), but generally not more than about 40 weight percent.

Control Polymers: Control 1—This control polymer (Example 0) is made with an acrylate amine version, DMANPA. Control 2—This control polymer (Example 18) is made with DMAEMA. Control 3—DMAEMA based commercial polymer (Carbopol® Aqua CC with INCI: Polyacrylate-1 Crosspolymer).

Table 1 describes a list of new copolymers and their compositions. These new polymers are synthesized using at least one amine monomer of the following: DMANPA, DMADMPMA, DMAPMA, DMABMA, and DMAEMA with other copolymerizable monomers. The multi-purpose polymer identified as Ex. No. 3 in Table 1 is prepared according to the general procedure described above, and as described in detail as follows. A monomer emulsion is prepared by adding with mixing agitation about 59.05 grams of ethyl acrylate, about 35 grams of DMADMPMA, about 1.8 grams of HEMA, about 4.0 grams of RAL307 and about 0.15 grams of TEGDMA into a reactor containing about 360 grams of water containing about 24.29 grams of Emulsogen E407 (70%) nonionic surfactant and about 2.0 grams of sodium lauryl sulfate (30%) anionic surfactant. The resulting mixture is agitated (about 200 rpm) at a temperature in the range of about 30 to about 40° C. under a nitrogen atmosphere until an emulsion is obtained. A solution of an oxidizing agent of about 0.16 grams of sodium persulfate in about 5 grams of water and a solution of reducing agent of about 0.12 parts by weight of Bruggolite® FF6 in about 5 grams of water are then added to the monomer emulsion, with mixing agitation, to initiate the polymerization reaction. The temperature of the reaction mixture is maintained at a temperature in the range of about 60 to about 70° C. for about 2.5 hours after addition of the initiator. Additional quantities of initiators (about 0.08 grams of sodium persulfate in about 3.0 grams of water and about 0.06 grams of Bruggolite® FF6 in about 3.0 grams of water for each additional quantity of initiator added) are added at about 1.0 hour and about 2.0 hours after the reaction is initiated. The temperature of the reaction is maintained at about 60 to about 70° C. for an additional two and half hours to complete the polymerization. The resulting polymer emulsion product is then cooled to room temperature, discharged from the reactor and recovered. The resulting polymer emulsion, Ex. No. 3, had a total polymer solids of about 21% by weight, a pH of about 7.79, and a viscosity of about 8.5 mPa·s. The remaining examples set forth in Table 1 are similarly prepared from the monomer components identified in the table.

Table 2 provides latex properties such as Percent TS, viscosity, pH, and an acid number for each polymer. The high acid number shown for a control polymer (Example 18) containing DMAEMA indicates a significant amount of monomer hydrolysis taking place during the polymerization. In contrast, the polymers of Examples 1, 12 and 13 show lower acid numbers, exhibiting improved hydrolytic stability for DMAPMA and DMABMA based polymers during polymerization. However, all other polymers give much lower acid numbers demonstrating better hydrolytic stability for the DMADMPMA based polymers and its blends (DMADMPMA/DMAPMA and DMADMPMA/DMAEMA) during polymerization.

Table 3 gives thickening properties for polymers listed in Table 1. All 2% TS gels (mucilage of 2 wt. % total polymer solids in deionized water) are made by neutralizing with 50% aqueous glycolic acid to pH 4.0 and then characterized for viscosity (20 RPM), YV, pH, and clarity (measured as turbidity in NTU).

The control polymer (Example 0) made with DMANPA shows inferior performance in thickening at 2% TS (mucilage of 2 wt. % total polymer solids in deionized water) as compared to methacrylate versions (polymer of Examples 1, 2, 2a, 3, 12 and 13).

TABLE 1

Composition of Polymers

| Ex. No. | MA | EA | MMA | nBA | 2EHA | TEGDMA | TMPTA | RAL 307 | Polyglykol A 32/550 | CSEM | HEMA | M1 | M2 | M3 | M4 | M5 |
|---|---|---|---|---|---|---|---|---|---|---|---|---|---|---|---|---|
| 0* | | 55.9 | | | | 0.1 | | 4 | | 3 | 2.0 | | | | | 35 |
| 1 | | 56.15 | | | | 0.05 | | 4 | | 3 | 1.8 | 35 | | | | |
| 2 | | 54.10 | | | | 0.1 | | 4 | | 5 | 1.8 | | 17.5 | | 17.5 | |
| 2a | | 54.15 | | | | 0.05 | | 4 | | 5 | 1.8 | | 17.5 | 17.5 | | |
| 3 | | 59.05 | | | | 0.15 | | 4 | | | 1.8 | | | | 35 | |
| 4 | | 54.15 | | | | 0.05 | | 4 | | 5 | 1.8 | | | | 35 | |
| 5 | | 59.10 | | | | | 0.1 | 4 | | | 1.8 | | | | 35 | |
| 6 | | 54.20 | | | | | | 4 | | 5 | 1.8 | | | | 35 | |
| 7 | | 59.20 | | | | | | 4 | | | 1.8 | | | | 35 | |
| 8 | | 54.15 | | | | 0.05 | | 4 | | 5 | 1.8 | | | | 35 | |
| 9 | | 56.15 | | | | 0.05 | | 4 | | 3 | 1.8 | | | | 35 | |
| 10 | | 59.00 | | | | | 0.2 | 4 | | | 1.8 | | | | 35 | |
| 11 | | 58.90 | | | | | 0.3 | 4 | | | 1.8 | | | | 35 | |
| 12 | | 56.15 | | | | 0.05 | | 4 | | 3 | 1.8 | 35 | | | | |
| 13 | | 56.15 | | | | 0.05 | | 4 | | 3 | 1.8 | | 35 | | | |
| 14 | | 54.15 | | | | 0.05 | | 4 | | 5 | 1.8 | | | | 8.75 | 26.25 |
| 15 | | 54.15 | | | | 0.05 | | 4 | | 5 | 1.8 | | | 17.5 | 17.5 | |
| 16 | | 63.20 | | | | | | | | | 1.8 | | | | 35 | |
| 17 | | 61.00 | | | | | | 4 | | | | | | | 35 | |
| 18* | | 61.00 | | | | | | 4 | | | | | | 35 | | |
| 19 | | 71.00 | | | | | | 4 | | | | | | | 25 | |
| 20 | | 61.00 | | | | | | | 4 | | | | | | 35 | |
| 21 | | 56.00 | | | | | | 4 | | | | | | | 40 | |
| 22 | | 21.8 | 39.2 | | | | | 4 | | | | | | | 35 | |
| 23 | | 66.00 | | | | | | 4 | | | | | | | 30 | |
| 24 | 61 | | | | | | | 4 | | | | | | | 35 | |

TABLE 1-continued

| Ex. No. | MA | EA | MMA | VEOVA-10 | DEIA | TEGDMA | RAL 307 | Polyglykol A 32/550 | CSEM | APE | Allyl Sucrose | MBA | TMPDAE | Si Macromer | ACE | M4 |
|---|---|---|---|---|---|---|---|---|---|---|---|---|---|---|---|---|
| 25 | | | | | | | 61 | | | 4 | | | | | | 35 |
| 26 | | 61 | | | | | | | | 4 | | | | | | 35 |
| 27 | | | | | | 61 | | | | 4 | | | | | | 35 |
| 28 | 15.2 | 45.8 | | | | | | | | 4 | | | | | | 35 |
| 29 | | 45.8 | 15.2 | | | | | | | 4 | | | | | | 35 |
| 30 | | 45.8 | | 15.2 | | | | | | 4 | | | | | | 35 |
| 31 | | 45.8 | | | 15.2 | | | | | 4 | | | | | | 35 |
| 32 | 15.2 | 45.7 | | | | 0.1 | | | | 4 | | | | | | 35 |
| 33 | | 45.7 | 15.2 | | | 0.1 | | | | 4 | | | | | | 35 |
| 34 | | 45.7 | 15.2 | | | | | | 0.1 | 4 | | | | | | 35 |
| 35 | | 45.7 | 15.2 | | | | | | | 0.1 | | | | | | 35 |
| 36 | | 45.7 | 15.2 | | | | | | | | 0.1 | | | | | 35 |
| 37 | | 45.7 | 15.2 | | | | 4 | | | | | 0.1 | | | | 35 |
| 38 | | 42.7 | 15.2 | | | | 4 | | 3 | | | 0.1 | | | | 35 |
| 39 | | 60.9 | | | | | | 4 | | | | 0.1 | | | | 35 |
| 40 | | 59.9 | | | | | | 4 | | | | 0.1 | | 1 | | 35 |
| 41 | | 45.7 | 15.2 | | | | 2 | 2 | | | | 0.1 | | | | 35 |
| 42 | 15.2 | 45.7 | | | | | 2 | 2 | | | | 0.1 | | | | 35 |
| 43 | 15.2 | 45.7 | | | | | 4 | | | | | 0.1 | | | | 35 |
| 44 | 15.2 | 45.8 | | | | | 4 | | | | | | | | | 35 |
| 44a | 15.2 | 47.8 | | | | | | | | | | | | | 2 | 35 |
| 44b | 15.2 | 44.8 | | | | | | | 3 | | | | | | 2 | 35 |

*Control Examples, see above; M1 is DMABMA; M2 is DMAPMA; M3 is DMAEMA; M4 is DMADMPMA; and M5 is DMANPA. All amounts are in weight percent of the total amount of the reaction charge.

M4 is DMADMPMA. All amounts are in weight percent of the total amount of the reaction charge.

TABLE 2

Latex Properties

| Example No. | TS** (wt. %) | Viscosity (mPa·s) | pH | Acid No. (mg KOH/g) |
|---|---|---|---|---|
| 0* | 20.07 | 8.3 | 9.0 | 12.74 |
| 1 | 20.97 | 20.0 | 8.80 | 14.38 |
| 2 | 20.88 | 10.5 | 8.44 | 10.87 |
| 2a | 21.36 | 9.5 | 8.17 | 10.82 |
| 3 | 21.31 | 8.5 | 7.79 | 7.24 |
| 4 | 21.01 | 8.0 | 7.65 | 9.01 |
| 5 | 21.23 | 8.5 | 8.42 | 7.24 |
| 6 | 21.09 | 9.0 | 7.43 | 9.07 |
| 7 | 21.03 | 9.0 | 8.12 | 7.11 |
| 8 | 21.30 | 9.5 | 6.89 | 8.27 |
| 9 | 21.34 | 9.5 | 7.06 | 8.22 |
| 10 | 21.46 | 9.5 | 9.21 | 10.78 |
| 11 | 21.98 | 9.5 | 7.33 | 7.51 |
| 12 | 21.25 | 40.0 | 10.21 | 16.08 |
| 13 | 21.69 | 29.5 | 9.22 | 13.39 |
| 14 | 20.98 | 9.5 | 8.96 | 15.10 |
| 15 | 21.14 | 10.0 | 8.41 | 14.25 |
| 16 | 21.19 | 9.5 | 8.61 | 10.16 |
| 17 | 22.21 | 10.0 | 8.75 | 7.79 |
| 18* | 20.64 | 12.50 | 8.54 | 20.45 |
| 19 | 22.44 | 9.50 | 8.87 | 6.58 |
| 20 | 21.76 | 9.50 | 8.66 | 9.83 |
| 21 | 21.92 | 10.00 | 8.92 | 8.77 |
| 22 | 22.33 | 10.0 | 8.02 | 7.21 |
| 23 | 22.65 | 10.0 | 7.67 | 6.85 |
| 24 | 21.74 | 9.5 | 8.08 | 10.20 |
| 25 | 20.38 | 9.5 | 9.52 | 7.97 |
| 26 | 21.48 | 10.0 | 8.44 | 7.31 |
| 27 | 19.4 | 9.5 | 8.84 | 0.00 |
| 28 | 21.86 | 9.50 | 7.83 | 9.26 |
| 29 | 21.86 | 9.50 | 8.14 | 7.02 |
| 30 | 19.08 | 9.0 | 8.59 | 9.76 |
| 31 | 21.29 | 9.5 | 7.98 | 8.10 |
| 32 | 21.45 | 9.5 | 7.67 | 8.19 |
| 33 | 21.51 | 9.0 | 8.38 | 6.84 |
| 34 | 21.53 | 9.5 | 8.35 | 8.18 |
| 35 | 21.57 | 9.5 | 8.34 | 6.95 |
| 36 | 21.46 | 9.5 | 8.2 | 8.26 |
| 37 | 21.46 | 9.5 | 8.44 | 6.66 |
| 38 | 25.59 | 12.5 | 7.68 | 8.04 |
| 39 | 28.19 | 13.5 | 8.26 | 7.14 |
| 40 | 26.51 | 12.0 | 8.44 | 6.31 |
| 41 | 28.04 | 13.0 | 8.05 | 7.50 |
| 42 | 27.86 | 14.0 | 8.09 | 6.94 |
| 43 | 28.04 | 14.0 | 7.98 | 7.37 |
| 44 | 28.05 | 13.0 | 8.18 | 6.57 |
| 44a | 27.69 | 12.5 | 8.17 | 8.43 |
| 44b | 26.2 | 13 | 7.94 | 9.77 |

*Control Example
**TS = total polymer solids

TABLE 3

Thickening Properties

| Example No. | pH | 2% Viscosity** (mPa·s) | Yield value (dyn/cm$^2$) | Turbidity (NTU) |
|---|---|---|---|---|
| 0* | 3.94 | 430 | 55 | NA |
| 1 | 3.97 | 16,400 | 2,246 | 15.0 |
| 2 | 4.16 | 14,000 | 1,900 | 8.35 |
| 2a | 4.07 | 23,000 | 3,270 | 9.53 |
| 3 | 4.04 | 14,500 | 1,700 | 29.3 |
| 4 | 4.02 | 15,400 | 1,970 | 12.3 |
| 5 | 3.99 | 9,600 | 1,120 | 5.71 |
| 6 | 3.94 | 16,500 | 2,020 | 19.5 |
| 7 | 4.01 | 5,800 | 508 | 4.72 |
| 8 | 4.10 | 14,700 | 1,760 | 10.1 |
| 9 | 4.03 | 14,700 | 1,810 | 18.3 |
| 10 | 3.88 | 4,300 | 490 | 45.7 |
| 11 | 4.08 | 8,000 | 990 | 11.7 |
| 12 | 3.97 | 3,960 | 352 | 26.5 |
| 13 | 4.03 | 20,300 | 2,740 | 12.0 |
| 14 | 4.07 | 15,300 | 1,960 | 8.64 |
| 15 | 3.95 | 22,000 | 3,110 | 4.03 |
| 16 | 4.09 | 4,920 | 424 | 3.60 |
| 17 | 4.08 | 8,600 | 860 | 8.59 |

TABLE 3-continued

Thickening Properties

| Example No. | pH | 2% Viscosity** (mPa·s) | Yield value (dyn/cm²) | Turbidity (NTU) |
|---|---|---|---|---|
| 18* | 3.97 | 7,400 | 910 | 5.37 |
| 19 | 3.94 | 1,590 | 106 | 16.30 |
| 20 | 4.01 | 6,400 | 638 | 4.34 |
| 21 | 3.96 | 8,100 | 1,090 | 3.31 |
| 22 | 3.87 | 2,700 | 245 | 14.7 |
| 23 | 3.87 | 7,350 | 776 | 28.7 |
| 24 | 3.89 | 8,800 | | 44.30 |
| 25 | 3.93 | 175 | 2 | 27.40 |
| 26 | 3.60 | 20 | 0 | 160 |
| 27 | 3.68 | 15 | 0 | 179 |
| 28 | 4.06 | 12,200 | 1,330 | 15.4 |
| 29 | 4.04 | 7,150 | 592 | 5.4 |
| 30 | 3.78 | 2,330 | 234 | 24.3 |
| 31 | 4.06 | 5,100 | 366 | 5.94 |
| 32 | 3.89 | 12,000 | 1,470 | 16.5 |
| 33 | 3.77 | 8,700 | 920 | 8.06 |
| 34 | 4.06 | 8,800 | 900 | 8.22 |
| 35 | 4.01 | 4,940 | 440 | 4.0 |
| 36 | 4.0 | 10,100 | 1,160 | 9.8 |
| 37 | 3.98 | 7,100 | 658 | 5.1 |

TABLE 3-continued

Thickening Properties

| Example No. | pH | 2% Viscosity** (mPa·s) | Yield value (dyn/cm²) | Turbidity (NTU) |
|---|---|---|---|---|
| 38 | 4.07 | 15,000 | 1,610 | 11.2 |
| 39 | 4.03 | 7,600 | 718 | 4.66 |
| 40 | 4.09 | 10,100 | 1,060 | 10.3 |
| 41 | 3.87 | 6,750 | 628 | 5.20 |
| 42 | 4.04 | 11,900 | 1,210 | 8.97 |
| 43 | 3.96 | 8,850 | 1,040 | 5.15 |
| 44 | 3.97 | 8,000 | 920 | 3.94 |
| 44a | 3.76 | 6,000 | 578 | 4.08 |
| 44b | 4.01 | 10,100 | 1.130 | 9.10 |

*Control Example
**2 wt. % polymer solids mucilage neutralized to pH 4 with a 50:50 (wt./wt.) H₂O/glycolic acid solution.

Hydrolytic Stability:

Improved shelf life performance of multi-purpose copolymers made with hydrolytically stable amine monomers (DMAPMA, and DMADMPMA) is demonstrated in the aging study as described below.

This study is performed at three different conditions such as: (1) latex stored at 45° C. for 3 months; (2) latex stored at 50° C. for 5 weeks; and (3) latex stored at room temperature for one to about two years.

Figure 3:
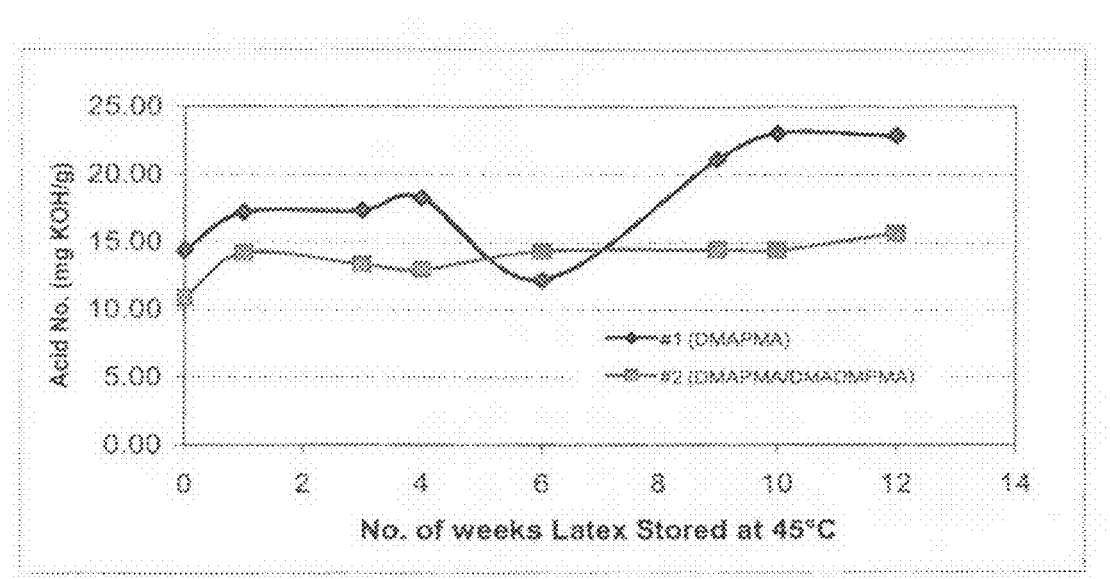
FIG. 3 is a is a plot of acid number versus number of weeks the latex is stored 45° C. for polymer Example 1 (DMAPMA) and polymer Example 2 (DMAPMA/DMADMPMA)

Aging Study at Elevated Temperature (Latex Stored at 45° C. for 3 Months):

Two polymers (Examples 1 and 2) are stored in a 45° C. oven for 3 months. Samples are removed periodically and tested for latex properties as well as their thickening properties (see Table 4). FIG. 3 provides the acid number in mg KOH/g (acid number) versus the number of weeks the latex is stored at 45° C. Both polymers exhibit a moderate (DMAPMA monomer) to excellent (using DMADMPMA monomer) shelf life performance at 45° C. temperature storage conditions.

TABLE 4

Thickening Performance of Aged Samples (3 Months at 45° C.)

| Ex. No. | Weeks at 45° C. | TS (wt. %) | pH | Viscosity (mPa·s) | Acid No. (mg KOH/g) | pH | Viscosity (mPa·s) | Yield Value (dyn/cm²) | Turbidity (NTU) |
|---|---|---|---|---|---|---|---|---|---|
| | | | | Latex properties | | | | Thickening Properties | |
| 1 | 0 | 20.97 | 8.80 | 20.0 | 14.38 | 3.97 | 16,400 | 2,240 | 15.0 |
| | 1 | 20.97 | 8.76 | 27.5 | 17.18 | 4.05 | 15,200 | 2,070 | 15.1 |
| | 3 | 20.93 | 8.62 | 32.5 | 17.34 | 4.03 | 16,800 | 2,180 | 14.9 |
| | 4 | 21.00 | 8.71 | 50.0 | 18.24 | 3.75 | 11,400 | 1,540 | 16.6 |
| | 6 | 21.08 | 8.60 | 35.0 | 12.22 | 4.26 | 12,900 | 1,710 | 18.2 |
| | 9 | 21.08 | ND | 30.0 | 21.16 | 4.02 | 12,200 | 1,610 | 17.1 |
| | 10 | 21.11 | 8.73 | 31.5 | 23.09 | 4.13 | 11,000 | 1,440 | 17.9 |
| | 12 | 21.13 | 8.78 | 36.5 | 22.89 | 3.96 | 10,500 | 1,380 | 19.2 |
| 2 | 0 | 20.88 | 8.44 | 10.5 | 10.87 | 4.16 | 14,000 | 1,900 | 8.35 |
| | 1 | 20.88 | 8.31 | 10.5 | 14.20 | 4.16 | 14,300 | 1,960 | 9.13 |
| | 3 | 20.79 | 8.08 | 12.0 | 13.34 | 4.01 | 17,600 | 2,250 | 9.11 |
| | 4 | 20.75 | 8.10 | 30.0 | 12.98 | 3.68 | 11,500 | 1,600 | 8.83 |
| | 6 | 20.76 | 8.05 | 12.0 | 14.34 | 4.18 | 14,700 | 2,100 | 9.54 |
| | 9 | 20.76 | ND | 12.0 | 14.45 | 4.11 | 15,000 | 2,030 | 10.00 |
| | 10 | 20.85 | 8.02 | 11.0 | 14.40 | 3.91 | 13,100 | 1,800 | 10.10 |
| | 12 | 20.81 | 8.12 | 11.5 | 15.69 | 3.93 | 12,700 | 1,730 | 12.10 |

Figure 4:
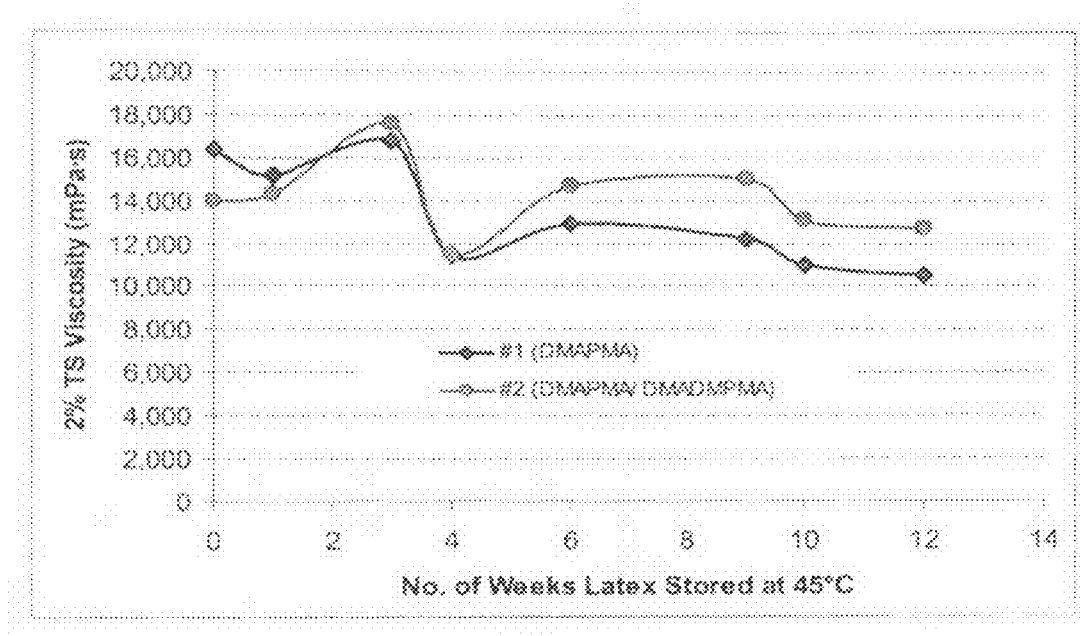
FIG. 4 is a plot of 2 percent TS viscosity versus number of weeks the latex is stored at 45° C. for Example 1 (DMAPMA) and polymer Example 2 (DMAPMA/DMADMPMA)

From aged polymers, two percent gels are prepared by neutralizing with 50% glycolic acid to pH 4. FIG. 4 below provides 2% gel viscosity (mPa·s) versus time (number of weeks latex stored at 45° C.).

Figure 5:
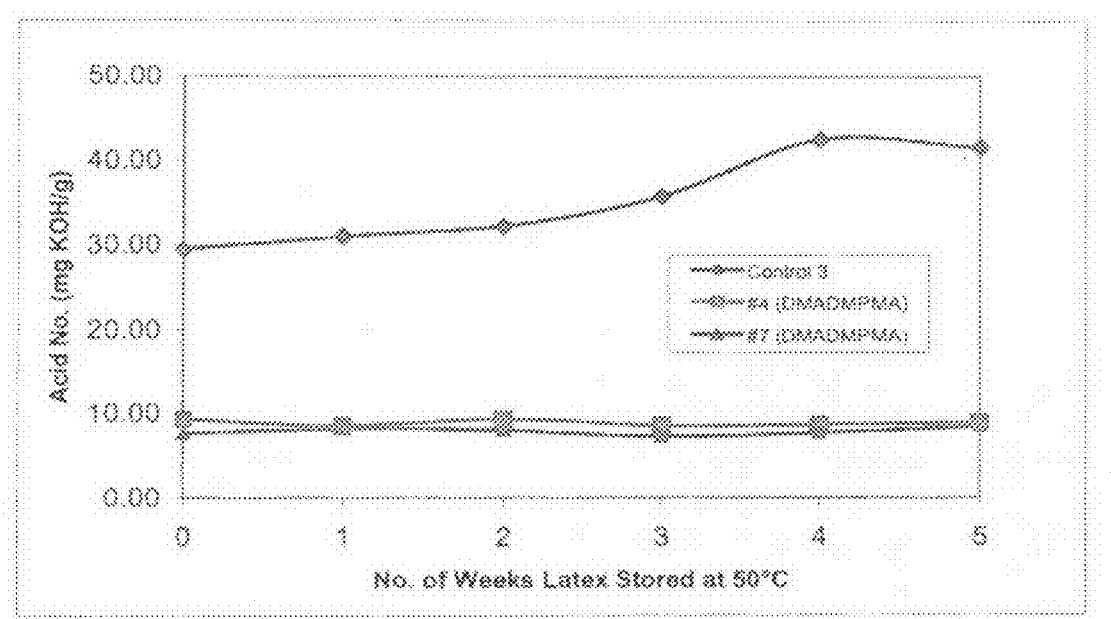
FIG. 5 is a plot of acid number versus number of weeks the latex is stored at 50° C. for a DMAEMA based commercial polymer (Control 3, INCI Name: Polyacrylate-1 Crosspolymer), polymer Example 4 (DMADMPMA), and polymer Example 7 (DMADMPMA)
Figure 6:
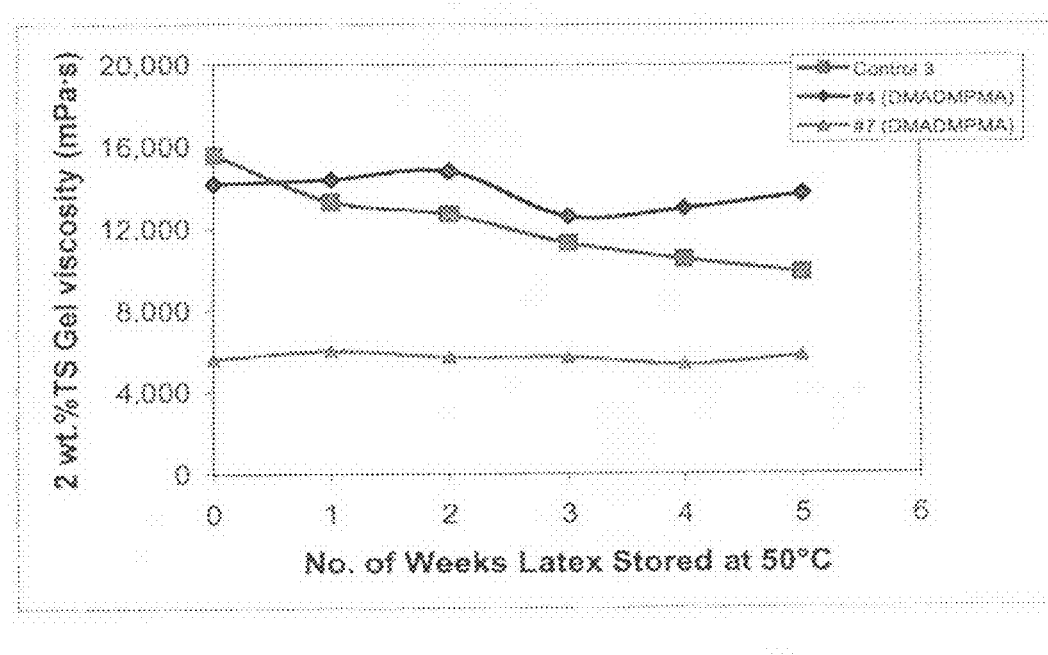
FIG. 6 is a plot of 2 percent TS gel viscosity versus number of weeks the latex is stored at 50° C. for a DMAEMA based commercial polymer (Control 3, INCI Name: Polyacrylate-1 Crosspolymer), polymer Example 4 (DMADMPMA), and polymer Example 7 (DMADMPMA)

Aging Study at Elevated Temperature (5 Weeks at 50° C.):

Two polymers (Examples 4 and 7) are stored in a 50° C. oven for 5 weeks. Samples are removed weekly and tested for latex properties and their thickening properties (Table 5). FIG. 5 provides the acid number in mg KOH/g versus time, (number of weeks latex stored at 50° C.) for both polymers which are synthesized using DMADMPMA. Similarly, FIG. 6 shows 2% wt. % TS gel viscosity versus time for both Examples 4 and 7 polymers against Control 3. Both Figures demonstrate a steady acid number and viscosity profile over time at 50° C., confirming a better hydrolytic stability for polymers made with the DMADMPMA monomer over Control 3.

Table 5 shows good stability for multi-purpose polymers at 50° C. and noticeably no drop in thickening efficiency in contrast to Control 3 which shows a steady degradation in thickening efficiency under the same condition.

TABLE 5

Thickening Performance for Aged Samples (5 Weeks at 50° C.)

| Ex. No. | Weeks at 50° C. | TS (wt. %) | pH | Viscosity (mPa·s) | Acid No. (mg KOH/g) | pH | Viscosity (mPa·s) | Yield Value (dyn/cm$^2$) | Turbidity (NTU) |
|---|---|---|---|---|---|---|---|---|---|
| | | | | Latex Properties | | | | Gel properties | |
| Control 3 | 0 | 20.27 | 8.33 | 20.0 | 29.50 | 3.87 | 15,600 | 1,400 | 3.49 |
| | 1 | 20.27 | 8.43 | 25.0 | 31.01 | 4.10 | 13,300 | 1,300 | 6.06 |
| | 2 | 20.14 | 8.27 | 20.0 | 32.31 | 3.75 | 12,700 | 1,230 | 6.29 |
| | 3 | 20.08 | 8.30 | 20.0 | 35.81 | 4.06 | 11,300 | 1,150 | 7.68 |
| | 4 | 20.08 | 8.18 | 10.0 | 42.53 | 4.14 | 10,500 | 1,150 | 8.46 |
| | 5 | 20.21 | 8.44 | 55.0 | 41.59 | 4.09 | 9,850 | 1,010 | 7.68 |
| 4 | 0 | 21.01 | 7.36 | 0.0 | 9.40 | 4.16 | 14,200 | 1,810 | 11.9 |
| | 1 | 21.01 | 7.28 | 0.0 | 8.65 | 4.06 | 14,400 | 1,850 | 12.3 |
| | 2 | 21.18 | 7.13 | 0.0 | 9.43 | 4.00 | 14,800 | 1,940 | 12.6 |
| | 3 | 21.01 | 7.31 | 0.0 | 8.66 | 4.04 | 12,600 | 1,690 | 14.4 |
| | 4 | 21.01 | 7.08 | 0.0 | 8.79 | 4.17 | 13,000 | 1,650 | 16.1 |
| | 5 | 21.12 | 7.17 | 15.0 | 9.02 | 4.03 | 13,700 | 1,750 | 12.8 |
| 7 | 0 | 21.03 | 7.91 | 0.0 | 7.71 | 4.17 | 5,600 | 496 | 4.86 |
| | 1 | 21.03 | 7.82 | 0.0 | 8.29 | 4.12 | 6,000 | 504 | 5.15 |
| | 2 | 21.17 | 7.68 | 0.0 | 8.13 | 3.95 | 5,700 | 448 | 5.26 |
| | 3 | 21.03 | 7.63 | 0.0 | 7.32 | 4.17 | 5,700 | 502 | 6.80 |
| | 4 | 21.03 | 7.26 | 0.0 | 7.83 | 4.12 | 5,350 | 476 | 6.54 |
| | 5 | 21.26 | 7.65 | 15.0 | 8.58 | 3.95 | 5,750 | 490 | 5.31 |

Product Color:

Typically, Control 3 stored at room temperature (RT) or 45° C. turns a brown color from milky white. However multipurpose polymers (Examples 4 and 7), made from DMADMPMA monomer have better color stability before and after storage at an elevated temperature (e.g., 50° C.).

Figure 7:
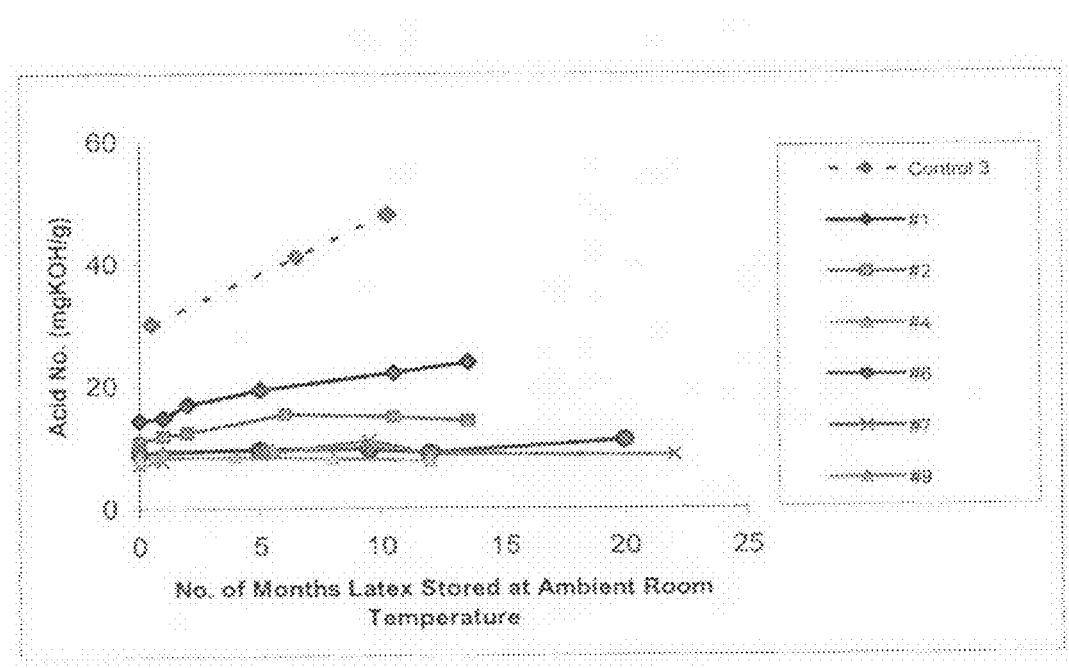
FIG. 7 is a plot of acid number versus number of months the latex is stored at room temperature for a DMAEMA based commercial polymer (Control 3, INCI Name: Polyacrylate-1 Crosspolymer), polymer Example 1, polymer Example 2, polymer Example 4, polymer Example 6, polymer Example 7, and polymer Example 9.

One to Two Year Aging Study at Room Temperature:

Eight polymers (Examples 1, 2, 4, 6, 7 8, 13, and 14) along with the Control 3 are monitored for their stability and are tested for their performance for about 9 months to approximately one year. Samples are removed periodically and are tested for latex properties and thickening properties. FIG. 7 exhibits acid number versus time (number of months latex stored at room temperature). All these polymers exhibit a moderate (Example 1, 2, 13, and 14) to excellent (Example 4, 6, 7, and 8) shelf life performance at ambient room temperature storage conditions (20° to 25° C.). In contrast, Control 3 undergoes a steady increase in the acid number during room temperature storage condition, indicating a gradual degradation of DMAEMA backbone.

Figure 8:
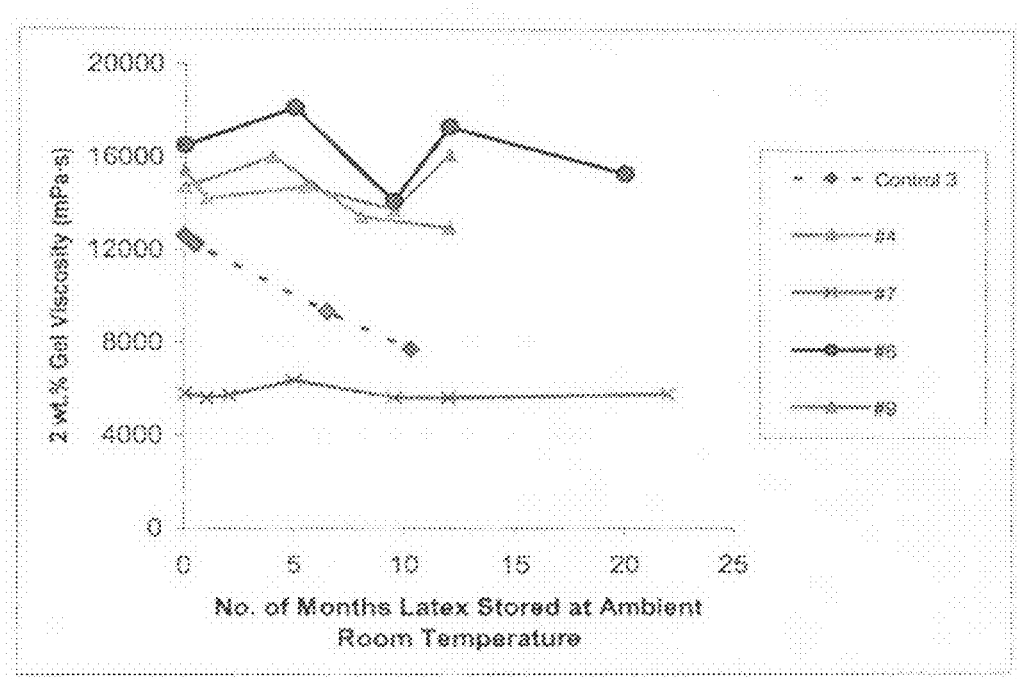
FIG. 8 is a plot of 2 percent gel viscosity versus number of months the latex is stored at room temperature a DMAEMA based commercial polymer (Control 3, INCI Name: Polyacrylate-1 Crosspolymer), polymer Example 4, polymer Example 6, polymer Example 7, and polymer Example 9.

FIG. 8 demonstrates thickening (2% gel) properties of DMADMPMA based polymers that are monitored periodically for one to about two years. All 4 polymers (Examples 4, 6, 7, and 9) showed a steady performance, indicating a good shelf life for these polymers, while Control 3 performance degrades gradually during this period because of its DMAEMA backbone.

Table 6 provides latex (wt. % TS, pH, viscosity, and acid number) and 2% Gel properties (viscosity, YV, and turbidity) for several multi-purpose polymers of the present invention. These properties are tested periodically for one to about two years. In general, the new polymers based on the DMADMPMA monomer pass the 1 year shelf life study within experimental error. Table 6 also offers thickening properties of amine blends (DMADMPMA/DMAEMA) based polymers (Examples 14 and 15) that are monitored periodically for 1 year. Polymer Examples 14 and 15 contain approximately 25% and 50% DMAEMA, respectively. Both polymers show a slight drop in their thickening performance but are still better than Control 3 which degrades gradually. Thickening properties of DMAPMA based polymers (Examples 1 and 2) show a steady performance up to six months and then a slight drop in viscosity at the tenth month but still better than Control 3.

Typically, Control 3 product stored at room temperature slowly changes from a milky white to a brown color. In contrast, the polymers of the present invention that are made from DMAPMA or DMADMPMA monomers have better color stability after one year at room temperature storage conditions.

TABLE 6

One year Shelf Life Study: Thickening Properties for Polymers

| Ex. No. | Months at RT* | TS (wt. %) | pH | Viscosity (mPa·s) | Acid No. | pH | 2% Viscosity** (mPa·s) | Yield Value (dyn/cm$^2$) | Turbidity (NTU) |
|---|---|---|---|---|---|---|---|---|---|
| | | | | Latex properties | | | | Gel Properties | |
| Control 3 | 0 | 20.49 | 8.10 | 24.0 | ND | 4.00 | 12,600 | 1,170 | 4.50 |
| | 0.5 | 20.49 | 8.27 | 20.5 | 30.10 | 3.99 | 12,200 | 1,240 | 6.46 |
| | 6.5 | 20.20 | 8.52 | 37.0 | 41.04 | 3.80 | 9,300 | 910 | 4.75 |
| | 10.25 | 20.04 | 8.76 | 4,300 | 48.01 | 4.18 | 7,700 | 794 | 6.56 |
| 1 | 0 | 20.97 | 8.80 | 20.0 | 14.38 | 3.97 | 16,400 | 2,240 | 15.0 |
| | 1 | 21.06 | 8.69 | 28.5 | 14.81 | 3.94 | 13,700 | 1,890 | 16.6 |
| | 2 | 20.97 | 8.69 | 34.5 | 17.01 | 4.15 | 15,900 | 2,140 | 16.3 |
| | 6 | 21.16 | 8.71 | ND | 19.32 | 3.93 | 15,800 | 1,980 | 15.8 |
| | 10.5 | 20.96 | 8.88 | some inc | 22.14 | 3.89 | 12,900 | 1,730 | 16.9 |
| | 13.5 | 21.43 | 8.93 | 120 (#3) | 23.80 | 4.04 | 10,700 | 1,380 | 19.8 |

TABLE 6-continued

One year Shelf Life Study: Thickening Properties for Polymers

| Ex. No. | Months at RT* | TS (wt. %) | pH | Viscosity (mPa·s) | Acid No. | pH | 2% Viscosity** (mPa·s) | Yield Value (dyn/cm$^2$) | Turbidity (NTU) |
|---|---|---|---|---|---|---|---|---|---|
| | | | | Latex properties | | | | Gel Properties | |
| 2 | 0 | 20.88 | 8.44 | 10.5 | 10.87 | 4.16 | 14,000 | 1,900 | 8.35 |
| | 1 | 20.91 | 8.21 | 10.5 | 11.84 | 3.78 | 14,000 | 1,910 | 7.96 |
| | 2 | 20.84 | 8.17 | 10.0 | 12.37 | 3.96 | 14,500 | 1,950 | 7.45 |
| | 6 | 20.80 | 8.19 | 10.0 | 15.34 | 3.84 | 16,400 | 2,080 | 7.64 |
| | 10.5 | 20.77 | 8.36 | 10.0 | 14.91 | 4.01 | 13,500 | 1,840 | 7.73 |
| | 13.5 | 20.95 | 8.28 | 11.5 | 14.24 | 4.03 | 12,800 | 1,730 | 8.99 |
| 4 | 0 | 21.01 | 7.65 | 8.0 | 9.01 | 4.02 | 15,400 | 1,970 | 12.3 |
| | 1 | 21.01 | 7.36 | 9.0 | 9.40 | 4.16 | 14,200 | 1,810 | 11.9 |
| | 5.5 | 20.99 | 7.19 | 8.5 | 9.70 | 4.05 | 14,700 | 1,850 | 12.1 |
| | 9.5 | 20.96 | 7.35 | 8.5 | 10.00 | 4.09 | 13,700 | 1,840 | 11.5 |
| | 12 | 21.03 | 7.23 | 9.0 | 8.99 | 3.81 | 16,100 | 1,870 | 11.7 |
| 6 | 0 | 21.09 | 7.43 | 9.0 | 9.07 | 3.94 | 16,500 | 2,020 | 19.50 |
| | 5 | 21.22 | 7.26 | 8.0 | 9.63 | 4.04 | 18,100 | 2,020 | 18.20 |
| | 9.5 | 21.31 | 7.29 | 9.0 | 9.64 | 3.99 | 14,100 | 1,850 | 19.20 |
| | 12 | 21.36 | 7.26 | 10.0 | 9.07 | 4.01 | 17,300 | 1,880 | 19.20 |
| | 20 | 21.55 | 7.21 | 9.5 | 11.16 | 4.02 | 15,300 | 1,970 | 18.20 |
| | 22 | 21.54 | | | 9.68 | 3.9 | 14,800 | 1,950 | 18.2 |
| 7 | 0 | 21.03 | 8.12 | 9.0 | 7.11 | 4.01 | 5,800 | 508 | 4.72 |
| | 1 | 21.03 | 7.91 | 8.0 | 7.71 | 4.17 | 5,600 | 496 | 4.86 |
| | 2 | 21.03 | | | | 4.09 | 5,700 | 464 | 5.22 |
| | 5 | 21.15 | 7.79 | ND | 8.79 | 3.98 | 6,350 | 544 | 4.94 |
| | 9.5 | 21.25 | 7.91 | good | 11.04 | 4.00 | 5,600 | 464 | 5.25 |
| | 12 | 21.56 | 7.74 | 15.0 (#3) | 8.85 | 3.71 | 5,600 | 486 | 5.02 |
| | 22 | 21.56 | | | 8.64 | 4.03 | 5,750 | 524 | 5.06 |
| 9 | 0 | 21.34 | 7.06 | 9.5 | 8.22 | 4.03 | 14,700 | 1,810 | 18.3 |
| | 4 | 21.30 | 6.94 | 8.5 | 8.35 | 4.02 | 16,000 | 1,850 | 17.9 |
| | 8 | 21.32 | 6.97 | 9.0 | 8.08 | 4.05 | 13,400 | 1,710 | 18.2 |
| | 12 | 21.32 | 7.05 | 9.5 | 7.68 | 4.04 | 12,900 | 1,630 | 19.8 |
| 14 | 0 | 20.98 | 8.96 | 9.5 | 15.10 | 4.07 | 15,300 | 1,960 | 8.64 |
| | 2 | 20.89 | 8.72 | 9.5 | 15.86 | 3.99 | 12,700 | 1,660 | 7.86 |
| | 6 | 20.71 | 8.68 | 9.0 | 15.70 | 4.06 | 14,200 | 1,830 | 8.00 |
| | 9 | 20.95 | 8.67 | 10.0 | 15.72 | 4.07 | 11,700 | 1,480 | 8.54 |
| 15 | 0 | 21.14 | 8.41 | 10.0 | 14.25 | 3.95 | 22,000 | 3,110 | 4.03 |
| | 2 | 20.86 | 8.30 | 9.5 | 16.93 | 3.91 | 18,700 | 2,380 | 3.97 |
| | 6 | 20.74 | 8.36 | 9.5 | 19.42 | 4.11 | 18,700 | 2,540 | 4.43 |
| | 9 | 20.94 | 8.42 | 11.5 | 19.81 | 4.09 | 18,500 | 2,350 | 4.26 |

*RT = ambient room temperature (approximately 20°-25° C.)
**2 wt. % polymer solids mucilage neutralized to pH 4 with a 50:50 (wt./wt.) H$_2$O/glycolic acid solution.

TABLE 7

One Year Aging Study Gel Data

| Ex. No. | Months at RT* | pH | Viscosity, (mPa·s) | Yield Value (dyn/cm$^2$) | Turbidity (NTU) | pH | Viscosity (mPa·s) | Yield Value (dyn/cm$^2$) | Turbidity (NTU) | pH | Viscosity (mPa·s) | Yield Value (dyn/cm$^2$) | Turbidity (NTU) | Suspension (visual rating) |
|---|---|---|---|---|---|---|---|---|---|---|---|---|---|---|
| | | | Set 1 (pH 6) | | | | Set 2 (pH 4) | | | | Set 3 (pH 6) | | | |
| 1 | 1 | 6.16 | 8,100 | 116 | 143 | 4.19 | 9,800 | 112 | 146 | 6.70 | 10,100 | 100 | 163 | |
| 1 | 13.5 | 6.08 | 7,000 | 64 | 160 | 4.00 | 10,100 | 76 | 171 | 6.06 | 10,200 | 56 | 191 | |
| 2 | 0 | 6.06 | 10,800 | 140 | 66.1 | 4.19 | 13,200 | 148 | 66.3 | 6.73 | 12,900 | 128 | 77.4 | |
| 2 | 13.5 | 6.07 | 9,700 | 92 | 75.9 | 4.09 | 12,500 | 92 | 79.4 | 6.09 | 12,500 | 84 | 91.5 | |
| 2a | | 5.78 | 12,000 | 224 | 65.9 | 4.12 | 15,000 | 232 | 67.5 | 6.17 | 14,800 | 192 | 78.5 | |
| 2a | 12 | 5.94 | 11,100 | 140 | 76.7 | 4.10 | 13,700 | 152 | 76.7 | 6.09 | 14,100 | 124 | 88.5 | |
| 4 | 0 | 6.14 | 12,200 | 212 | 77.9 | 4.17 | 15,600 | 204 | 75.3 | 6.42 | 14,600 | 276 | 92.1 | 0 |
| 4 | 12 | 5.88 | 12,800 | 196 | 76.8 | 4.05 | 16,800 | 308 | 78.7 | 6.19 | 16,500 | 156 | 95.1 | 1 |
| 6 | 0 | 5.98 | 11,000 | 236 | 56.4 | 4.15 | 14,600 | 300 | 54.3 | 6.05 | 14,300 | 256 | 65.7 | 4 |
| 6 | 12 | 5.96 | 12,000 | 184 | 61.8 | 4.16 | 14,200 | 188 | 61.5 | 6.17 | 14,700 | 148 | 74.4 | 4 |
| 7 | 0 | 6.01 | 17,700 | 208 | 9.07 | 4.13 | 21,800 | 220 | 9.43 | 6.15 | 23,200 | 270 | 12.1 | 0 |
| 7 | 12 | 5.90 | 17,500 | 196 | 11.3 | 4.13 | 22,200 | 210 | 12.1 | 5.86 | 22,600 | 280 | 16.0 | 0 |
| 8 | 0 | 6.08 | 14,300 | 296 | 51.8 | 4.11 | 19,200 | 450 | 50.5 | 5.93 | 19,400 | 360 | 57.4 | 4 |
| 8 | 11 | 6.01 | 13,400 | 236 | 58.7 | 3.93 | 15,400 | 204 | 58.8 | 6.08 | 17,800 | 184 | 71.4 | 2 |
| 9 | 0 | 6.06 | 10,300 | 236 | 67.9 | 4.09 | 14,500 | 310 | 65.7 | 6.58 | 12,200 | 168 | 90.0 | 3 |
| 9 | 11 | 5.89 | 10,400 | 164 | 76.1 | 4.04 | 13,600 | 172 | 76.3 | 5.95 | 13,000 | 134 | 90.5 | 4 |
| 14 | 0 | 5.96 | 10,500 | 208 | 31.9 | 4.00 | 13,600 | 208 | 32.1 | 5.94 | 14,100 | 204 | 37.3 | 2 |
| 14 | 9 | 5.95 | 12,400 | 180 | 36.8 | 4.06 | 16,900 | 220 | 37.0 | 5.94 | 17,300 | 180 | 45.1 | 1 |

TABLE 7-continued

One Year Aging Study Gel Data

| Ex. No. | Months at RT* | pH | Viscosity, (mPa·s) | Yield Value (dyn/cm²) | Turbidity (NTU) | pH | Viscosity (mPa·s) | Yield Value (dyn/cm²) | Turbidity (NTU) | pH | Viscosity (mPa·s) | Yield Value (dyn/cm²) | Turbidity (NTU) | Suspension (visual rating) |
|---|---|---|---|---|---|---|---|---|---|---|---|---|---|---|
| | | | | Set 1 (pH 6) | | | | Set 2 (pH 4) | | | | Set 3 (pH 6) | | |
| 15 | 0 | 6.00 | 12,900 | 286 | 15.8 | 3.94 | 16,600 | 286 | 15.8 | 5.97 | 16,400 | 282 | 18.4 | 1 |
| 15 | 9 | 5.68 | 18,800 | 370 | 17.2 | 3.98 | 24,200 | 390 | 17.9 | 6.00 | 23,900 | 370 | 22.9 | 2 |

*RT = ambient room temperature (approximately 20°-25° C.)

Quaternized Polymers

The multi-purpose polymers of Examples 45 and 46, as shown in Table 8, are prepared and subsequently quaternized (theoretical value of 50% degree of quaternization) using diethyl sulfate at approximately 60° C. Both quaternized polymers are pourable with viscosities of 670 and 1,880 mPa·s. The turbidities are 160 and 248 NTU, respectively.

TABLE 8

Composition

| Ex. No. | EA | MMA | RAL 307 | CSEM | HEMA | DMADMPMA | Diethyl Sulfate |
|---|---|---|---|---|---|---|---|
| 45 | 54.2 | | 4 | 5 | 1.8 | 35 | 2.75 |
| 46 | 20.0 | 39.2 | 4 | 0 | 1.8 | 35 | 2.75 |

Amine Oxide Polymers—Solution Polymers

Amine copolymers (Examples 47-50) are prepared using DMADMPMA as a comonomer and converting them to their amine oxide using $H_2O_2$ and compared against DMAEMA based amine oxide polymers. The DMADMPMA polymer gives a lower acid number in solution polymerization than the DMAEMA. A low acid number indicates the better hydrolytic stability of DMADMPMA. Table 9 shows composition details for each polymer.

TABLE 9

Composition for Amine Oxide Polymers

| Ex. No. | DMAEMA | DMAD-MPMA | MMA | SMA | VP | Mam | $H_2O_2$ | Solvent | Acid No. (mg KOH/g) |
|---|---|---|---|---|---|---|---|---|---|
| 47 | 70 | 0 | 10 | 20 | 0 | 0 | 1.1 ratio | IPA | NA |
| 48 | 0 | 70 | 10 | 20 | 0 | 0 | 1.1 ratio | IPA | NA |
| 49 | 60 | 0 | 0 | 0 | 20 | 20 | 1.1 ratio | EtOH | 40.45 |
| 50 | 30 | 30 | 0 | 0 | 20 | 20 | 1.1 ratio | EtOH | 33.34 |

What is claimed is:

1. A polymer that is the reaction product of the polymerization of a monomer mixture comprising:

(i) a mixture comprising (a), (b) and (c);
(ii) a mixture comprising (a), (b) and (d);
(iii) a mixture comprising (a), (b) and (e);
(iv) a mixture comprising (a), (b), (c) and (d);
(v) a mixture comprising (a), (b), (c) and (e);
(vi) a mixture comprising (a), (b), (d) and (e); or
(vii) a mixture comprising (a), (b), (c), (d) and (e);

where monomer component (a) is at least one amino-substituted (meth)acrylate (ASMA) monomer or salt thereof; monomer component (b) is at least one nonionic vinyl (NIV) monomer; monomer component (c) is at least one vinyl associative (VA) monomer; monomer component (d) is at least one vinyl surfactant (VS) monomer; monomer component (e) is at least one polymerizable silicone macromer (PSM), and wherein any of the above mixtures further optionally contain: (f) at least one crosslinking (XL) monomer; (g) at least one chain transfer agent (CTA); (h) at least one polymeric stabilizer; or any suitable combination of two or more of components (f), (g) and/or (h), wherein monomer component (a) is selected from 2-(dimethylamino)propyan-2-yl methacrylate, 3-(dimethylamino)-2,2-dimethylpropyl methacrylate, 2-(dimethylamino)-2-methylpropyl methacrylate, salts of one or more thereof, or mixtures of any one or more thereof.

2. The composition of claim 1, wherein monomer component (b) is selected from at least one copolymerizable, non-ionic, ethylenically unsaturated monomer represented by Formulas (III) and (IV):

$$C(X)_2=C(X)Z \quad \text{(III)}$$

$$CH_2=CH-OC(O)R_1 \quad \text{(IV)}$$

wherein, in each of Formulas (III) and (IV), each X is independently hydrogen, methyl, —$CH_2C(O)OR_1$, —$C(O)OR_1$; and Z is —$C(O)OR_1$, —$C_6H_4R_1$, —$C_6H_4OR_1$, —CN, —$C(O)N(R_1)_2$, —$NHC(O)CH_3$, —NHC(O)H, —$C(O)OA'OR_{15}$N-(2-pyrrolidonyl), N-caprolactamyl, —$C(O)NHCH_2CH_2$—N-ethyleneurea, or —$C(O)NHC(CH_3)_3$; A' is a divalent radical selected from —$CH_2CH(OH)CH_2$— and —$CH_2CH(CH_2OH)$—, each $R_1$ is independently linear and branched $C_1$ to $C_{30}$ alkyl, hydroxy-substituted $C_2$ to $C_{30}$ alkyl, $C_5$ to $C_{30}$ cycloalkyl, and $C_1$ to $C_5$ alkyl-substituted $C_5$ to $C_{30}$ cycloalkyl; $R_{15}$ is an acyl residue of a linear or branched, saturated or unsaturated $C_6$ to $C_{22}$ fatty acid.

3. The composition of claim 2, wherein monomer component (b) is selected from at least one $C_1$ to $C_{30}$ alkyl(meth)

acrylate, at least one hydroxy $C_2$ to $C_{30}$ alkyl(meth)acrylate, at least one $C_1$ to $C_{30}$ alkyl(meth)acrylamide, at least one styrene; at least one substituted styrene, at least one vinyl ester, at least one unsaturated nitrite, the reaction product of glycidyl t-decanoate and acrylic acid, the reaction product of glycidyl t-decanoate and methacrylic acid, or any combination of two or more thereof.

4. The polymer of claim 2, wherein monomer component (b) is selected from methyl acrylate, ethyl acrylate, methyl methacrylate, n-butyl acrylate, 2-ethylhexyl acrylate, 3,3,5-trimethylcyclohexyl methacrylate, stearyl methacrylate, and suitable mixtures of any two or more thereof.

5. The polymer of claim 1, wherein monomer component (c) is selected from at least one monomer that has: (A) an ethylenically unsaturated end group portion for addition polymerization with the other monomers of the monomer mixture, (B) a polyoxyalkylene midsection portion for imparting selective hydrophilic properties to the product polymer, and (C) a hydrophobic end group portion for providing selective hydrophobic properties to the polymer.

6. The polymer of claim 1, wherein monomer component (c) is selected from at least one monomer represented by Formula (V):

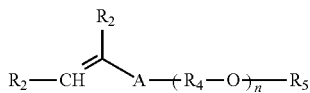

(V)

wherein, each $R_2$ is independently H, methyl, —C(O)OH, or —C(O)OR$_3$; $R_3$ is $C_1$ to $C_{30}$ alkyl; A is —CH$_2$C(O)O—, —C(O)O—, —O—, or —CH$_2$O—; (R$_4$—O)$_n$ is a polyoxyalkylene, which is a homopolymer, a random copolymer, or a block copolymer of $C_2$ to $C_4$ oxyalkylene units, wherein each $R_4$ is independently $C_2H_4$, $C_3H_6$, $C_4H_8$, or a mixture thereof, and n is an integer in the range of about 5 to about 250; and wherein $R_5$ is a substituted or unsubstituted alkyl selected from linear or branched $C_8$ to $C_{40}$ alkyls, $C_8$ to $C_{40}$ carbocyclic alkyls, $C_2$ to $C_{40}$ alkyl-substituted phenyls, aryl-substituted $C_2$ to $C_{40}$ alkyls, and $C_8$ to $C_{80}$ complex esters, wherein the $R_5$ alkyl group optionally comprises one or more substituents selected from a hydroxyl group, an alkoxyl group, or a halogen group.

7. The polymer of claim 1, wherein monomer component (c) is selected from one or more of cetyl polyethoxylated methacrylate, cetearyl polyethoxylated methacrylate, stearyl polyethoxylated (meth)acrylate, arachidyl polyethoxylated (meth)acrylate, behenyl polyethoxylated methacrylate, lauryl polyethoxylated methacrylate, cerotyl polyethoxylated (meth)acrylate, montanyl polyethoxylated (meth)acrylate, melissyl polyethoxylated (meth)acrylate, lacceryl polyethoxylated (meth)acrylate, tristyryl phenolpolyethoxylated methacrylate, hydrogenated castor oil polyethoxylated methacrylate, canola polyethoxylated (meth)acrylate, and cholesterol polyethoxylated methacrylate, where the polyethoxylated portion of the monomer comprises about 5 to about 100 ethylene oxide repeating units.

8. The polymer of claim 1, wherein monomer component (d) is selected from at least one monomer represented by Formula (VI):

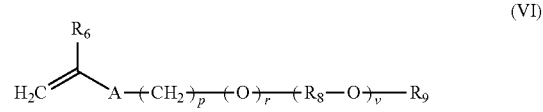

(VI)

where each $R_6$ is independently hydrogen or methyl, —C(O)OH, or —C(O)OR$_7$; $R_7$ is $C_1$ to $C_{30}$ alkyl; A is —CH$_2$C(O)O—, —C(O)O—, —O—, or —CH$_2$O—; p is an integer in the range of 0 to about 30, and r is 0 or 1, with the proviso that when p is 0, r is 0, and when p is in the range of 1 to about 30, r is 1; (R$_8$—O)$_v$ is a polyoxyalkylene, which is a homopolymer, a random copolymer or a block copolymer of $C_2$ to $C_4$ oxyalkylene units, wherein each $R_8$ is independently $C_2H_4$, $C_3H_6$, $C_4H_8$, or a mixture thereof, and v is an integer in the range of about 1 to about 250; and $R_9$ is hydrogen or $C_1$ to $C_4$ alkyl.

9. The polymer of claim 1, wherein monomer component (d) is selected from at least one monomer having one of the following chemical Formulas:

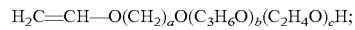

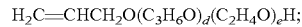

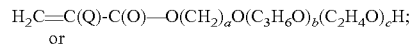

or

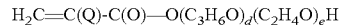

wherein Q is hydrogen or methyl; a is 2, 3, or 4; b is 0 or an integer in the range of 1 to about 10; c is 0 or an integer in the range of about 5 to about 50; d is 0 or an integer in the range of 1 to about 10; and e is 0 or an integer in the range of about 1 to about 50, subject to the proviso that b and c cannot be 0 at the same time, and d and e cannot be 0 at the same time.

10. The polymer of claim 1, wherein monomer component (e) is selected from at least one polymerizable silicone macromer represented by the following Formula:

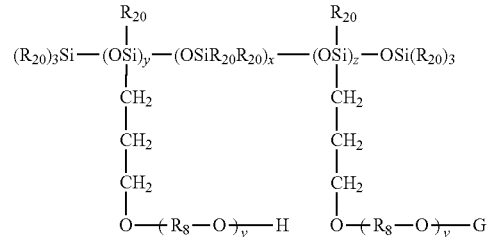

where each $R_{20}$ is independently selected from linear or branched $C_1$ to $C_{30}$ alkyl, $C_4$ to $C_{20}$ aryl, or $C_2$ to $C_{20}$ alkeneyl; where (R$_8$—O)$_v$ is a polyoxyalkylene moiety, which can be arranged as a homopolymer, a random copolymer or a block copolymer of $C_2$ to $C_4$ oxyalkylene units, wherein each $R_8$ is independently $C_2H_4$, $C_3H_6$, $C_4H_8$, or a mixture thereof, and v is an integer in the range of about 1 to about 250; x is an integer in the range of 0 to about 200; y is an integer in the range of 0 to about 200; and z is an integer in the range of 1 to about 200; and where G is selected from any moiety that contains at least one free radically polymerizable carbon-carbon double bond.

11. The polymer of claim 1, wherein the monomer mixture further comprises component (f) and component (f) is present, based on a total monomer mixture weight basis, in the range of about 0.001 weight percent to about 5 weight percent.

12. The composition of claim 1, wherein said polymer is polymerized from a monomer mixture selected from (ii) comprising (a), (b) and (d), wherein monomer component (a) is selected from at least one of 2-(dimethylamino)propan-2-yl methacrylate; 3-(dimethylamino)-2,2-dimethylpropyl methacrylate; 2-(dimethylamino)-2-methylpropyl methacrylate; and mixtures thereof; monomer component (b) is selected from at least one of a $C_1$ to $C_{30}$ alkyl(meth)acrylate, hydroxyl-substituted $C_1$ to $C_{30}$ alkyl(meth)acrylate, and mixtures thereof; and monomer component (d) is selected from at least one monomer represented by the formula:

$$H_2C=CHCH_2O(C_3H_6O)_d(C_2H_4O)_eH$$

and mixtures thereof, wherein d ranges from 1 to 20, and e ranges from 5 to 40.

13. The composition of claim 12, wherein said polymer is polymerized from a monomer mixture comprising 3-(dimethylamino)-2,2-dimethylpropyl methacrylate, ethyl acrylate, methyl acrylate, and a monomer represented by the formula:

$$H_2C=CHCH_2O(C_3H_6O)_{2-10}(C_2H_4O)_{10-25}H.$$

14. The composition of claim 1, wherein said polymer is polymerized from a monomer mixture selected from (i) comprising (a), (b) and (c), wherein monomer component (a) is selected from at least one of 3-(dimethylamino)propyl methacrylate; 2-(dimethylamino)propan-2-yl methacrylate; 3-(dimethylamino)-2,2-dimethylpropyl methacrylate; 2-(dimethylamino)-2-methylpropyl methacrylate; 4-(dimethylamino)butyl methacrylate, and mixtures thereof; monomer component (b) is selected from at least one of a $C_1$ to $C_{30}$ alkyl(meth)acrylate, and mixtures thereof; and monomer component (c) is selected from at least one monomer selected from one or more of cetyl polyethoxylated methacrylate, cetearyl polyethoxylated methacrylate, stearyl polyethoxylated (meth)acrylate, arachidyl polyethoxylated (meth)acrylate, behenyl polyethoxylated methacrylate, lauryl polyethoxylated methacrylate, cerotyl polyethoxylated (meth)acrylate, montanyl polyethoxylated (meth)acrylate, melissyl polyethoxylated (meth)acrylate, lacceryl polyethoxylated (meth)acrylate, tristyryl phenolpolyethoxylated methacrylate, hydrogenated castor oil polyethoxylated methacrylate, canola polyethoxylated (meth)acrylate, and cholesterol polyethoxylated methacrylate, where the polyethoxylated portion of the monomer comprises about 5 to about 100 ethylene oxide repeating units.

15. The composition of claim 12, wherein said polymer is polymerized from a monomer mixture where monomer (b) is selected from ethyl acrylate, stearyl methacrylate, and mixtures thereof.

16. The composition of claim 14, wherein said polymer is polymerized from a monomer mixture further comprising monomer component (d) selected from at least one monomer represented by the formula:

$$H_2C=CHCH_2O(C_3H_6O)_d(C_2H_4O)_eH$$

and mixtures thereof, wherein d ranges from 1 to 20, and e ranges from 5 to 40.

17. The composition of claim 15, wherein said polymer is polymerized from a monomer mixture where monomer (a) is 3-(dimethylamino)-2,2-dimethylpropyl methacrylate, and monomer (d) is represented by the formula $H_2C=CHCH_2O(C_3H_6O)_{2-10}(C_2H_4O)_{10-25}H$.

18. The composition of claim 16, wherein said polymer is polymerized from a monomer mixture comprising 3-(dimethylamino)-2,2-dimethylpropyl methacrylate, ethyl acrylate, cetearyl polyethoxylated methacrylate, and a monomer represented by the formula $H_2C=CHCH_2O(C_3H_6O)_{2-10}(C_2H_4O)_{10-25}H$.

19. The composition of claim 12, wherein said polymer is polymerized from a monomer mixture further comprising a crosslinking monomer.

20. The composition of claim 13, wherein said polymer is polymerized from a monomer mixture further comprising a crosslinking monomer.

21. The composition of claim 14, wherein said polymer is polymerized from a monomer mixture further comprising a crosslinking monomer.

22. The composition of claim 15, wherein said polymer is polymerized from a monomer mixture further comprising a crosslinking monomer.

23. The composition of claim 16, wherein said polymer is polymerized from a monomer mixture further comprising a crosslinking monomer.

24. The composition of claim 17, wherein said polymer is polymerized from a monomer mixture further comprising a crosslinking monomer.

25. The composition of claim 18, wherein said polymer is polymerized from a monomer mixture further comprising a crosslinking monomer.

* * * * *